United States Patent [19]

Bell

[11] Patent Number: 5,057,754

[45] Date of Patent: Oct. 15, 1991

[54] MOISTURE-SENSING WINDOW CLEANING CONTROL SYSTEM

[75] Inventor: Marl J. Bell, Valley Center, Calif.

[73] Assignee: Mist-Defy'R, Inc., Encinitas, Calif.

[21] Appl. No.: 547,946

[22] Filed: Jul. 3, 1990

Related U.S. Application Data

[63] Continuation-in-part of Ser. No. 258,159, Oct. 14, 1988, Pat. No. 4,942,349.

[51] Int. Cl.⁵ .............................................. B60S 1/08
[52] U.S. Cl. .................................... 318/483; 318/434; 318/DIG. 2; 15/250 C; 15/250.16
[58] Field of Search ........ 318/483, 439, 434, 282–286, 318/466–467, 443, 444, DIG. 2; 15/250 C, 250, 250.05, 250.02, 250.13, 250.16, 250.17; 361/23, 30, 31, 33; 307/116–126, 144, 141, 10.1, 141.4

[56] References Cited

U.S. PATENT DOCUMENTS

| | | | |
|---|---|---|---|
| 3,794,847 | 2/1974 | Cadiou | 307/117 |
| 3,873,927 | 3/1975 | Overall | 307/116 |
| 4,010,382 | 3/1977 | Grassman | 318/483 |
| 4,123,792 | 10/1978 | Gephart et al. | 307/126 |
| 4,430,681 | 2/1984 | Benzing | 318/783 |
| 4,705,994 | 11/1987 | Millerd et al. | 318/444 |
| 4,742,280 | 5/1988 | Ishikawa et al. | 318/444 X |
| 4,825,134 | 4/1989 | Tracht | 318/DIG. 2 |
| 4,827,198 | 5/1989 | Mueller et al. | 318/483 |
| 4,831,493 | 5/1989 | Wilson et al. | 361/286 |
| 4,897,585 | 1/1990 | Millerd et al. | 318/483 |

Primary Examiner—William M. Shoop, Jr.
Assistant Examiner—A. Jonathan Wysocki
Attorney, Agent, or Firm—Brown, Martin Haller & McClain

[57] ABSTRACT

An automatic control system for operating an electrically actuated device, such as a windshield wiper, power window, sun roof or convertible top of a motor vehicle, in response to the presence of water moisture. The control system includes a moisture sensor having a plurality of spaced apart, exposed conductive strips, the strips being arranged in adjacent pairs; a voltage source coupled to one strip of each pair; a current detector coupled to the other strip of each pair to discriminate between the presence or absence of moisture droplets on each pair; a drop accumulation detector, coupled to the current detector, for determining the number of pairs of sensor strips which are contacted by moisture droplets; and an electrical switch, coupled to the droplet detector, for switching on the electrical device in response to the number of droplets present on the moisture sensor. Means for automatic activation of a window washer in response to the detection of moisture contaminated with salts or oils are provided, together with means for activating a window heater in response to the detection of ice by the disclosed control system.

30 Claims, 27 Drawing Sheets

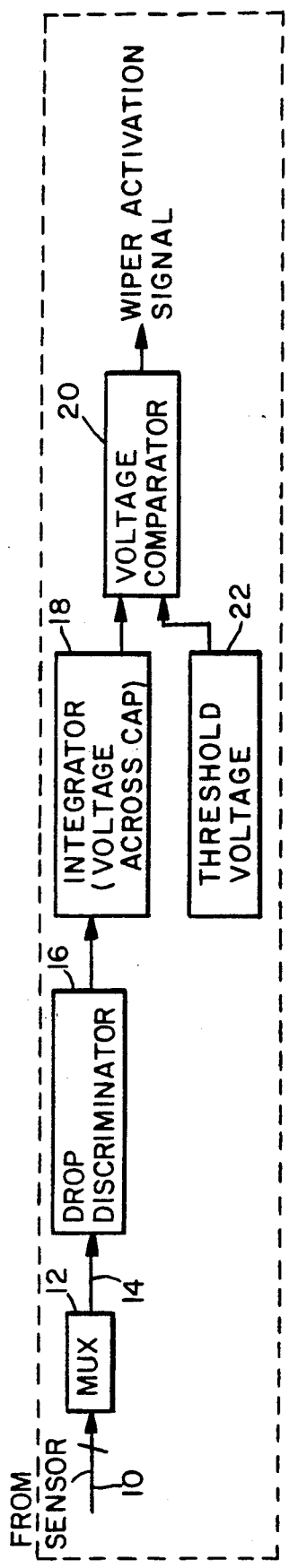
FIG. IA
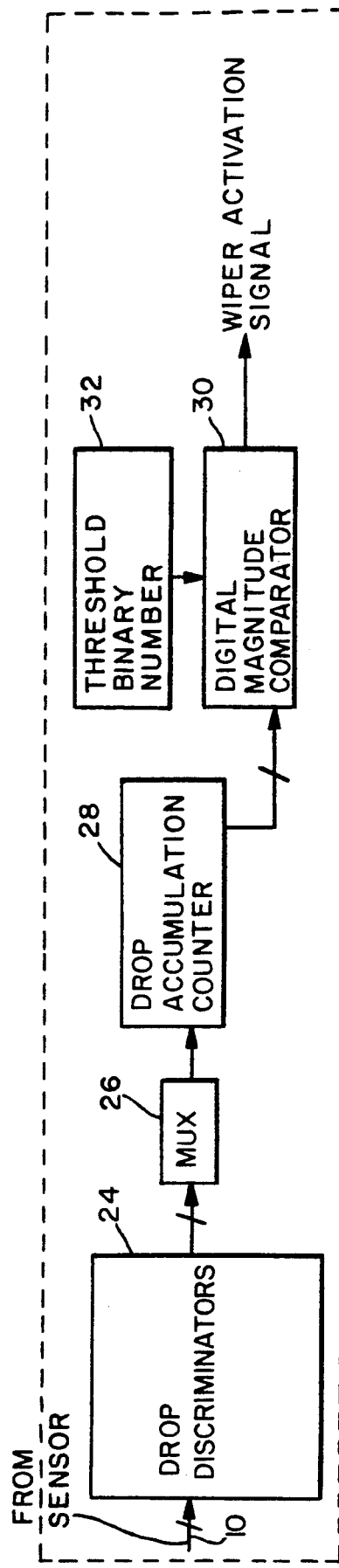
FIG. IB

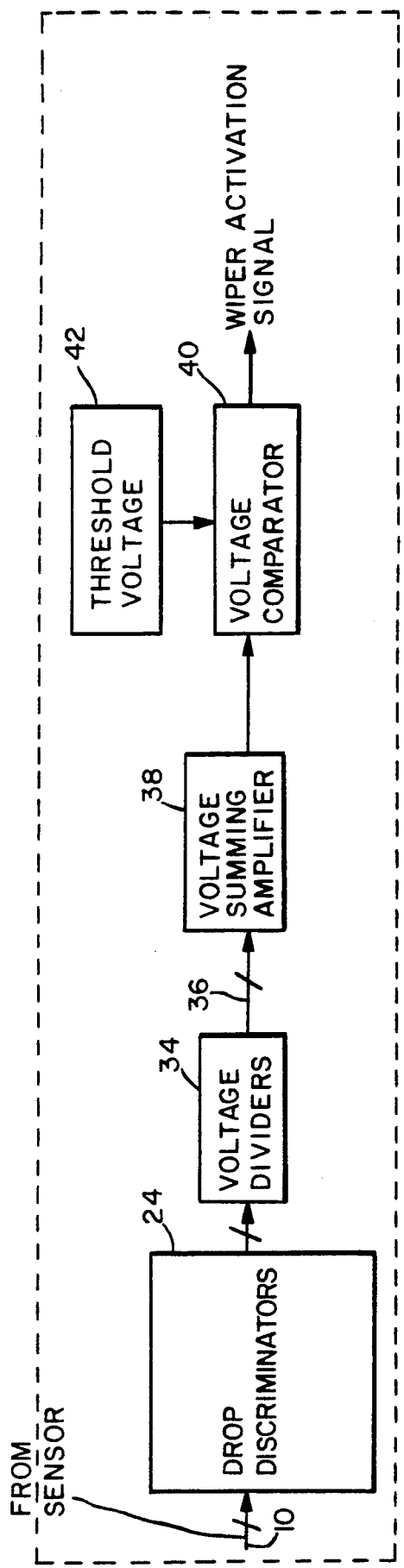
FIG. IC
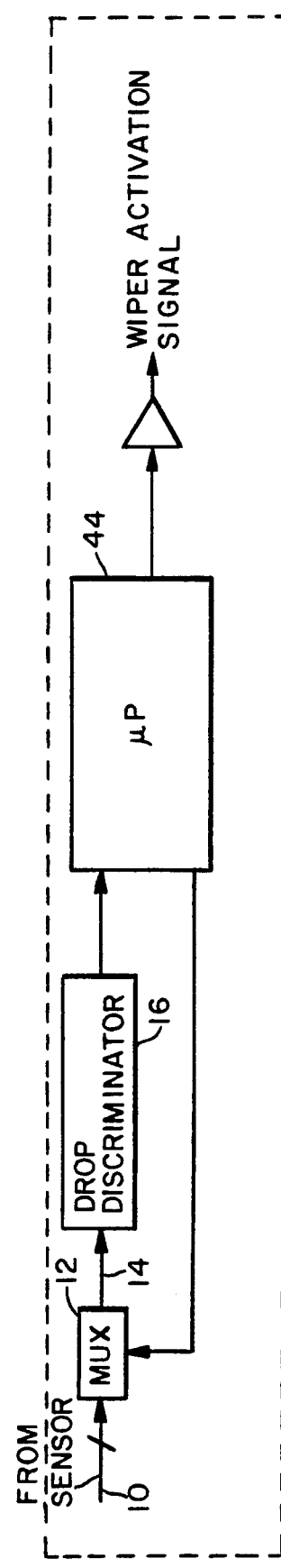
FIG. ID

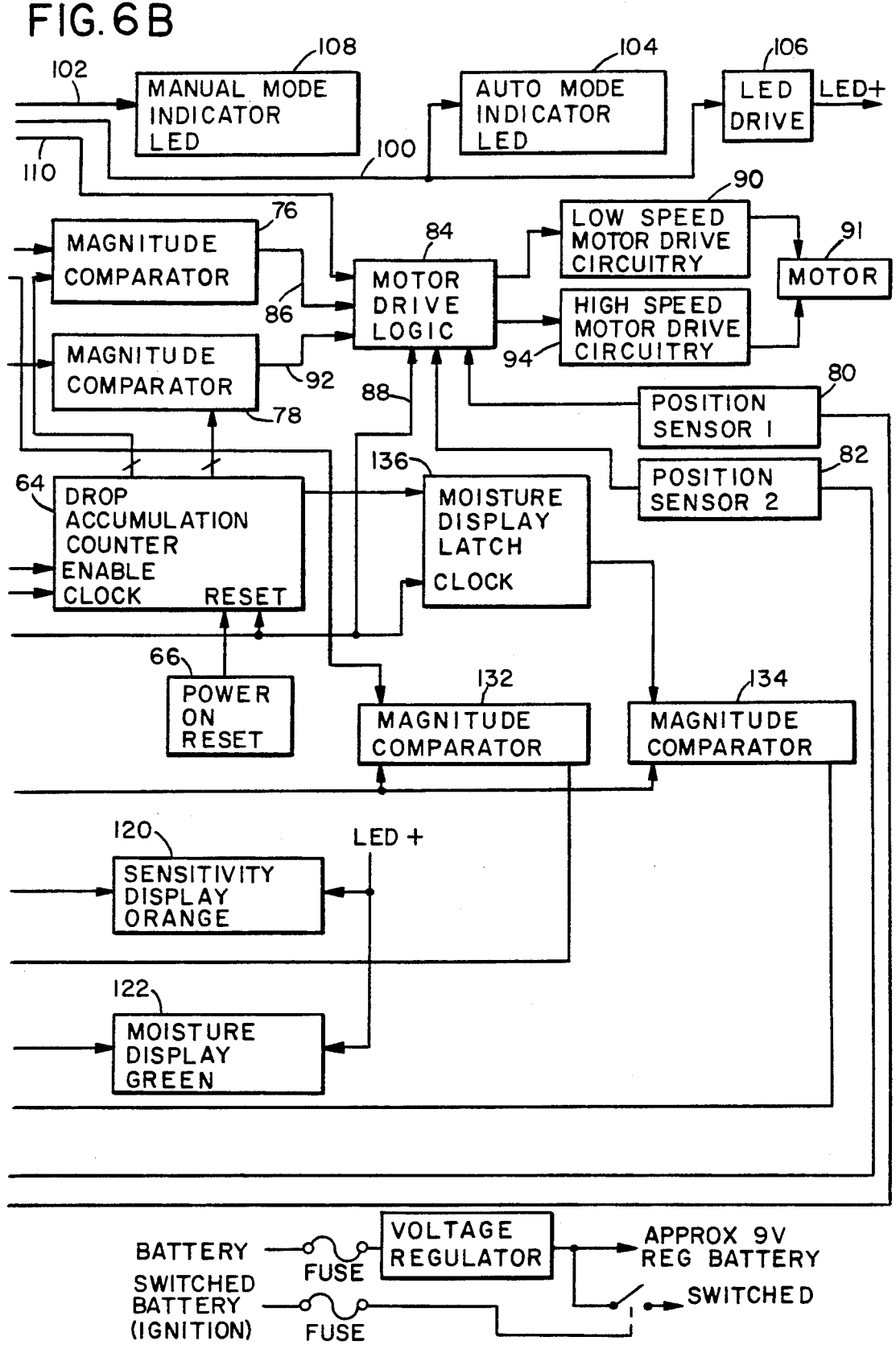

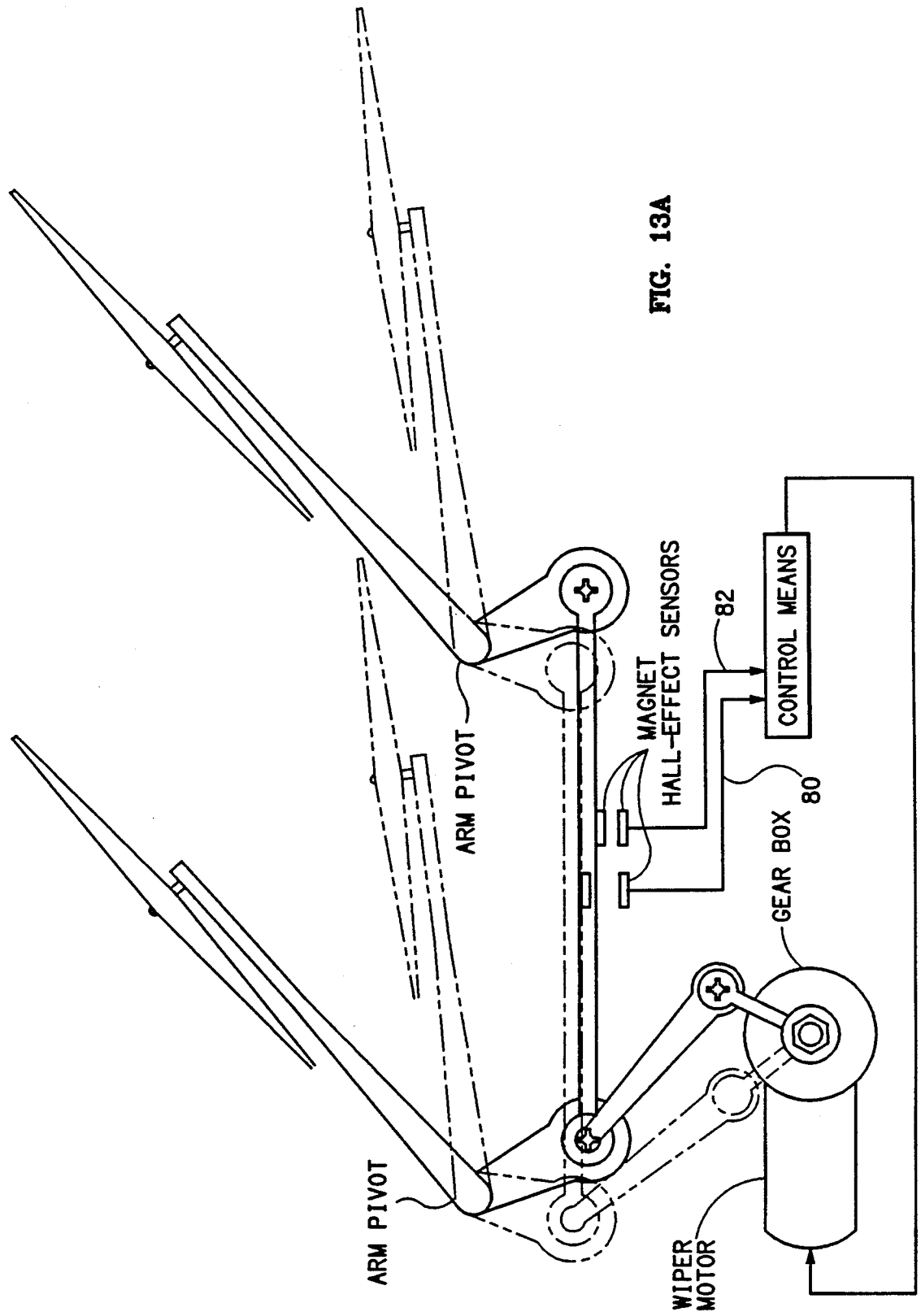

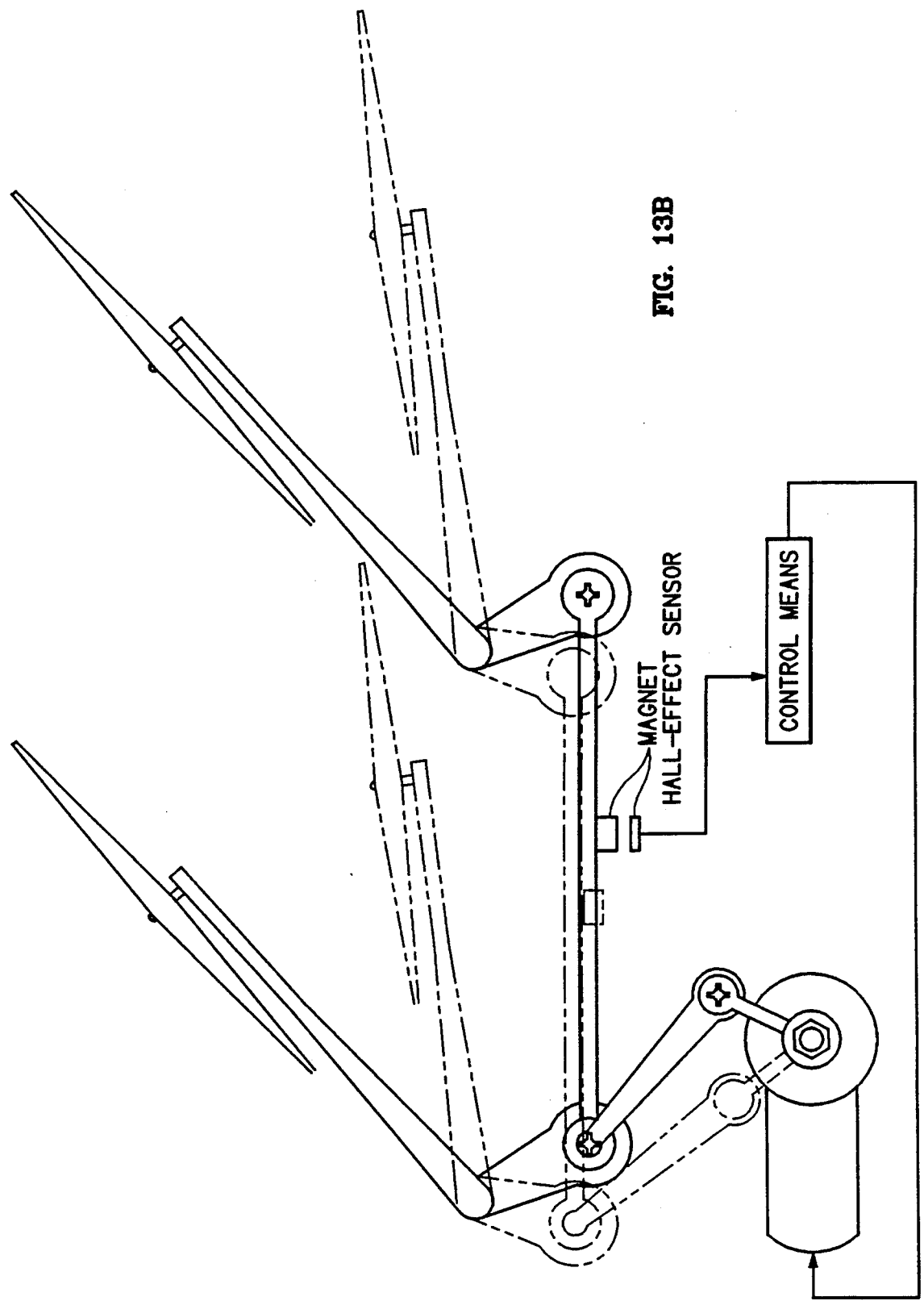

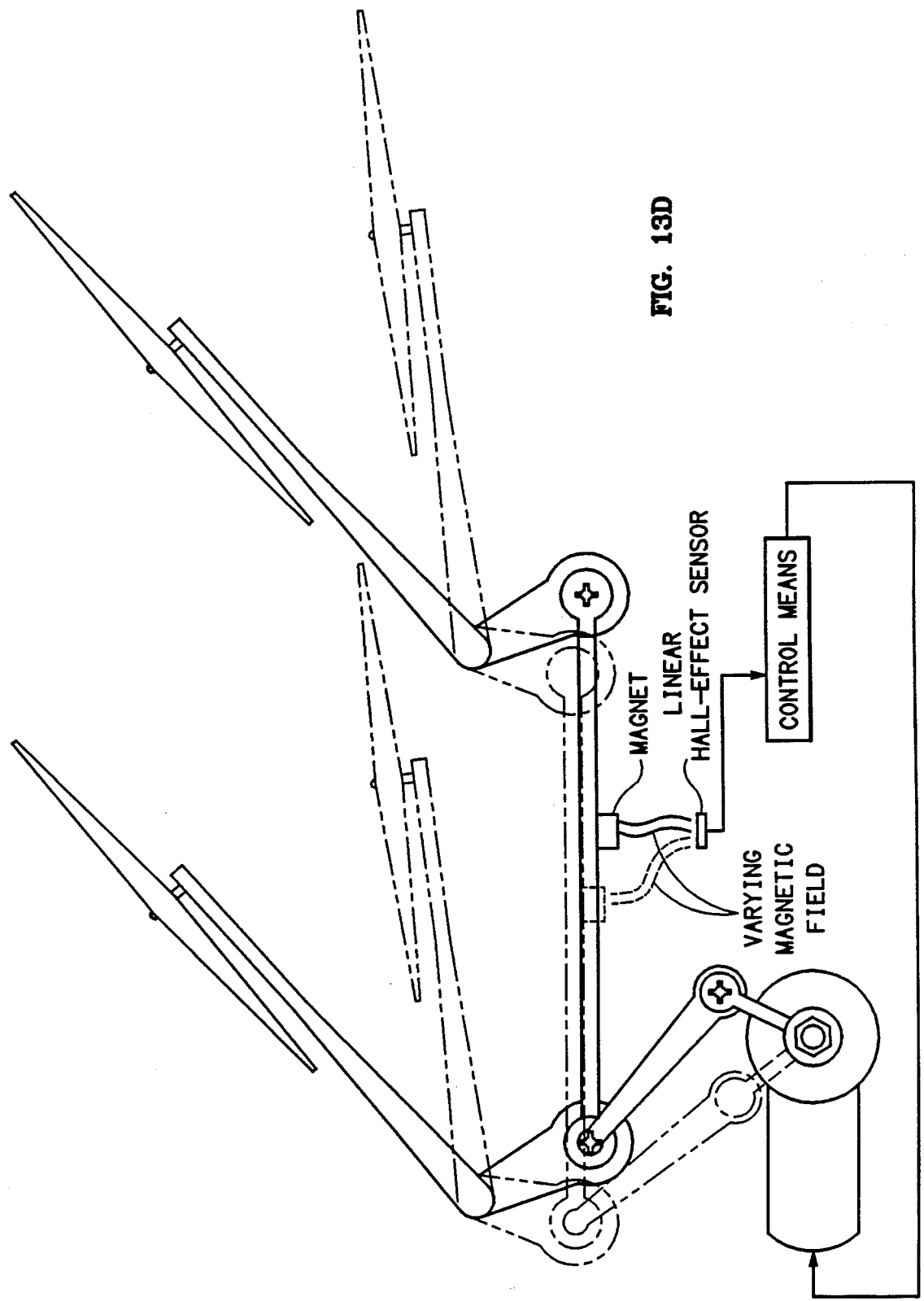

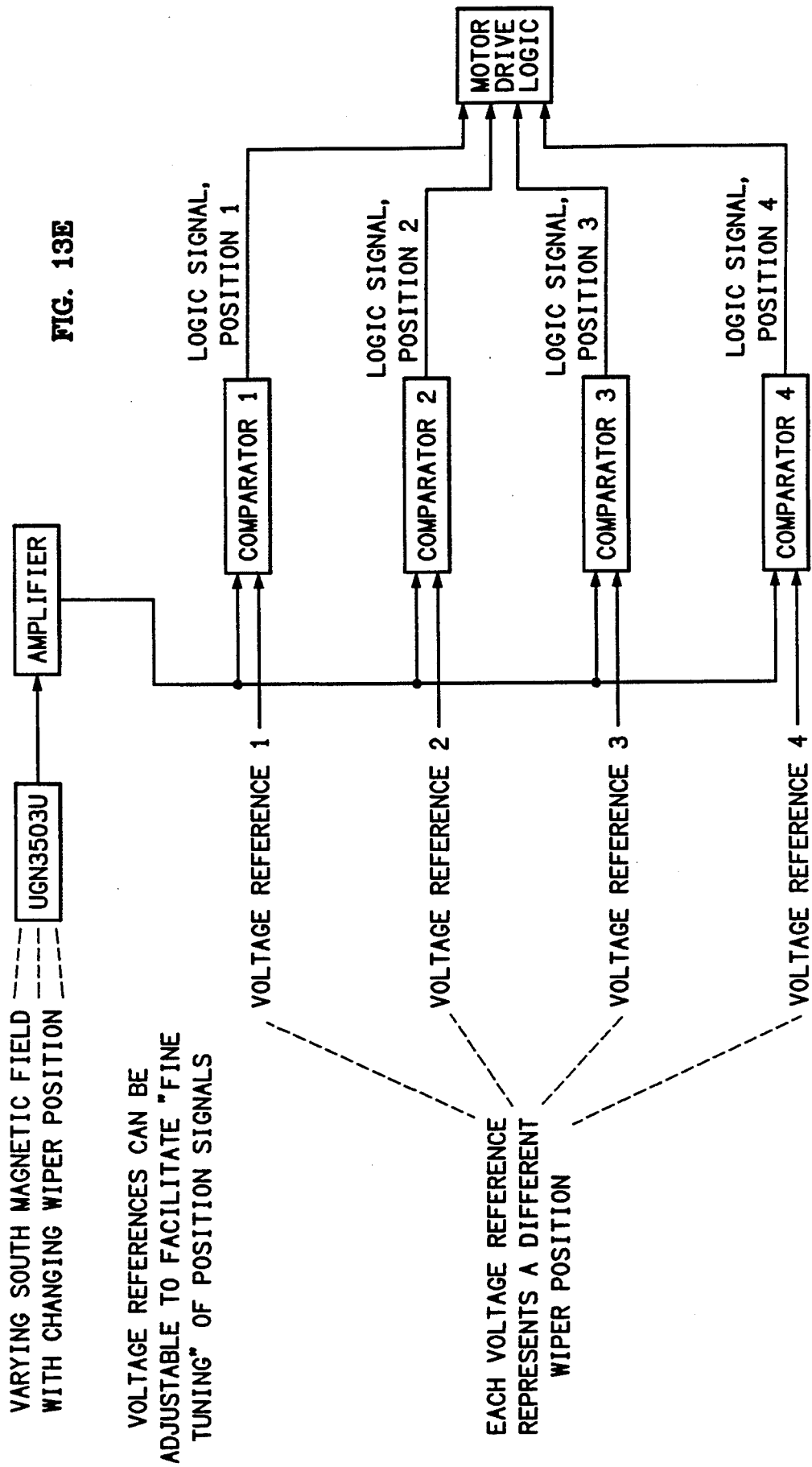

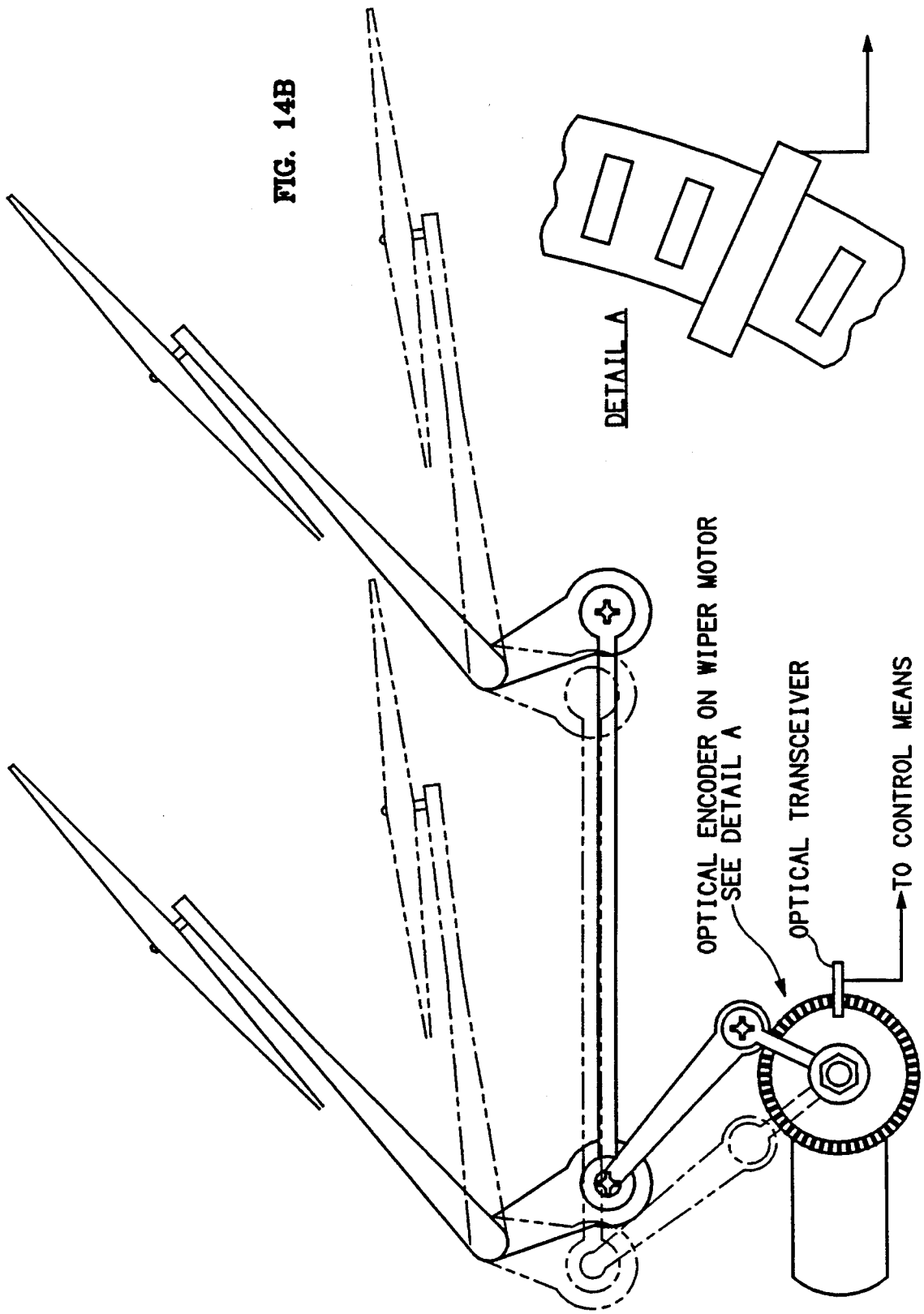

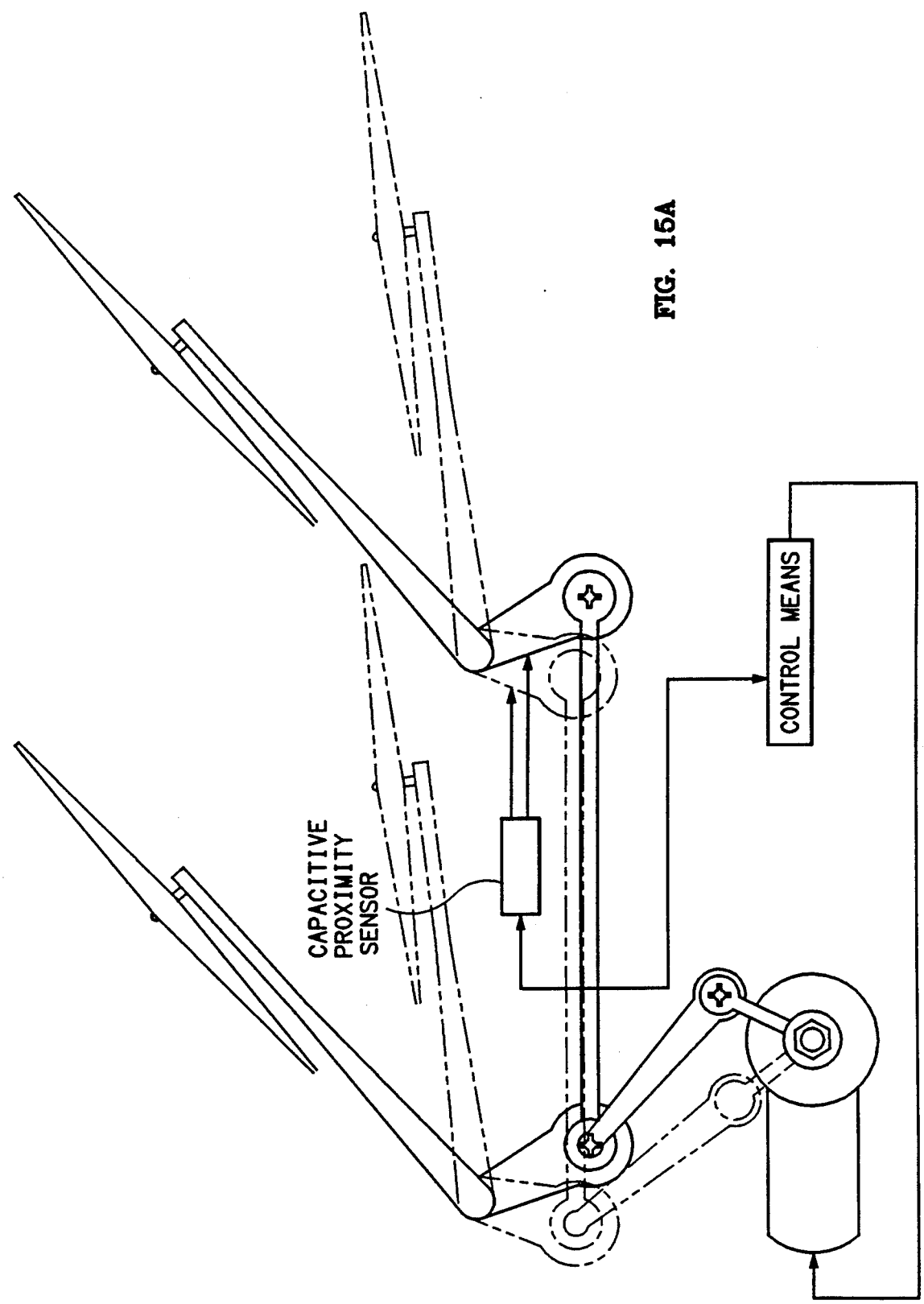

MOISTURE-SENSING WINDOW CLEANING CONTROL SYSTEM

CROSS REFERENCES TO RELATED PATENTS AND PATENT APPLICATIONS

This application is a continuation-in-part of U.S. patent application Ser. No. 258,159 filed Oct. 14, 1988 by Donald L. Millerd and Marl J. Bell, now U.S. Pat. No. 4,942,349, entitled "MOISTURE-RESPONSIVE CONTROL SYSTEM." The name order of inventorship is revised in this application to read Marl J. Bell and Donald L. Millerd. The subject matter of this application is related to that disclosed and claimed in the U.S. Pat. No. 4,705,998 of Donald L. Millerd and Marl J. Bell entitled "AUTOMATIC WINDOW WIPER CONTROL" which patent was the subject of reissue application Ser. No. 175,041 filed Mar. 29, 1988, now U.S. Pat. No. Re. 33308. The subject of this application is also related to that disclosed and claimed n the U.S. patent application Ser. No. 221,866 filed July 20, 1988 by Donald L. Millerd and Marl J. Bell, now U.S. Pat. No. 4,897,585 entitled "MOISTURE SENSOR".

BACKGROUND OF THE INVENTION

I. Field Of The Invention

The present invention relates to an automatic control system for operating an electrically actuated device in response to the presence of water moisture. A preferred application of the present invention is to operate a window wiper, such as a windshield wiper for a motor vehicle, in response to the presence of water moisture on the windshield. Other applications of the invention include the automatic closing of one or more power windows, a sun roof or a convertible top of a motor vehicle in response to the presence of water moisture on the vehicle.

II. Description of the Related Art

The aforementioned U.S. Pat. No. 4,705,988 relates to an automatic window wiper control which employs, as a moisture sensor, a plurality of spaced apart, exposed conductive strips. These strips, which are preferably both linear and parallel, are positioned on a motor vehicle windshield so as to encounter, and be cleaned by a window wiper blade during its normal to and fro sweep. Connected to the moisture sensor is an electronic control circuit which converts the moisture level on successive pairs of sensor strips to a DC voltage. When the DC voltage exceeds a first threshold level, the windshield wiper motor is switched on at its normal speed. When the DC voltage exceeds a second, higher threshold level, the windshield wiper motor is caused to operate at its high speed. When the DC voltage falls below the lower threshold, the control circuit switches off the wiper motor. If the wiper motor is switched off during a wiper sweep, as is normally the case, the normal homing or parking circuit of the wiper motor continues to operate the motor until the wiper blade or blades reach the wiper blade home position.

While the control system disclosed in the U.S. Pat. No. 4,705,998 operates satisfactorily to detect moisture and control the wiper motor accordingly, the moisture detection circuit may not always accurately reflect the moisture condition of the windshield. For example, if one of the plurality of pairs of conductive strips of the moisture sensor are effectively "shorted" together by a single moisture droplet containing a high level of impurities, the windshield wiper will be actuated even though only few moisture droplets are present on the windshield. Conversely, if exceedingly "clean" rain falls on the moisture sensor so that the resistance between the pairs of conductive strips remains high, notwithstanding the presence of substantial moisture, the control circuit will not detect the presence of such moisture and will therefore not switch on the wiper motor.

The aforementioned U.S. Pat. No. 4,705,998 discloses a moisture sensor comprising "printed circuit" type conductive strips. Since this moisture sensor is positioned where it can be wiped by the windshield wiper, it is located in the normal field of view of the driver. The aforementioned U.S. patent application Ser. No. 221,866 discloses various configurations of a moisture sensor of this type which can be located out of the normal field of view of the driver swept by the windshield wiper. In this case, however, separate means are provided for repetitively removing the moisture from the exposed surface of the moisture sensor in synchronism with the movement of the window wiper. This moisture sensor has the disadvantage of requiring a separate mechanism which not only increases the cost of the device but is subject to problems of reliability.

The aforementioned U.S. patent application Ser. No. 258,159, which is entirely included herein except for the claims, discloses a number of improvements that overcome these and other problems encountered in the related art. The claims made in application Ser. No. 258,159 failed to claim all novel and useful improvements. The specification in application Ser. No. 258,159 did not completely disclose embodiments for such details as keeping the wiper motor operating until the blades are parked by the built-in homing or parking switch in the wiper motor, alternative multiplexing schemes for connecting the sensor strips to the current detection means, and alternative position sensing embodiments. This present application, which is a continuation-in-part of application Ser. No. 258,159, discloses these features in more detail and claims all of the novel and useful features of the present invention as conceived by the inventors.

SUMMARY OF THE INVENTION

It is a general object of the present invention to provide a control system for operating an electrically actuated device, such as a windshield wiper, a power window, a sun roof or a convertible top of a motor vehicle, in response to the presence of water moisture, which control system overcomes the disadvantages of the prior systems described above.

It is a more particular object of the present invention to provide a control system of the above-described type which can discriminate and count individual water droplets which are deposited on a moisture sensor.

It is still another object of the present invention to provide a control system of the above-described type which is capable of sensing the presence of water droplets on a moisture sensor, notwithstanding variations in the electrical resistance of the water.

It is a still further object of the present invention to provide a moisture sensor for a control system of the above-described type which can be, and is attached to a substrate, such as a glass window or windshield, in such a way as to be permanent and not subject to removal.

It is another object of the present invention to provide control means suitable for removing power from the wiping apparatus when frozen in place by ice and for keeping alive the power to the wiping apparatus after ignition shutdown until the wiping apparatus is fully moved to a park position.

It is a further object of the present invention to provide a moisture sensor for a control system of the above described type which can be arranged on a clear glass window or windshield without obstructing the view through the window or windshield.

These objects, as well as further objects which will become apparent from the discussion that follows, are achieved, according to the present invention, by providing a control system which comprises a current detector, coupled to receive the current flow through each pair of sensor strips, either successively or in parallel, to discriminate between the presence or absence of moisture droplets on each pair of strips; a drop accumulation detector, coupled to the current detector, for determining the number of pairs of sensor strips which are contacted by moisture droplets; and switch means, coupled to the droplet detector, for switching on an electrically actuated device in response to the number of droplets present on the moisture sensor.

The current detector can either be a single current threshold device which is successively connected to individual pairs of conductive strips of the moisture sensor by means of a multiplexer, or it may comprise a plurality of detectors, each coupled to a single one of the pairs. In either case, the current detector determines whether moisture between two adjacent sensor strips causes current flow, from one strip to the other, which exceeds a first prescribed threshold.

In a preferred embodiment of the present invention, the device for determining the number of pairs of adjacent sensor strips for which the current flow exceeds the first prescribed threshold comprises a drop accumulation counter which makes a binary count of the number of pairs of sensor strips for which the current flow through each pair exceeds the first prescribed threshold. This count is then compared with a second prescribed threshold to determine the number of droplets on the moisture sensor at any given time. If the number of droplets exceeds this second threshold, remedial action, such as switching on a window wiper, closing windows, closing a sun roof or a convertible top, is taken. This second threshold, which determines the action to be taken, may, in fact, be divided into a plurality of thresholds, for example a first, lower threshold in which a windshield wiper is turned on at a slow speed, and a second, higher threshold in which the windshield wiper is turned on at a higher speed.

According to another feature of the present invention, a moisture sensor is provided for operating a wiper system for a transparent, preferably glass window. The sensor comprises a plurality of spaced apart, conductive strips disposed on the surface of the window. The strips are made of a clear conductive "thin film" which has been deposited on the window by chemical vapor deposition, or some other deposition technique such as spraying or sputtering with a thickness of up to 4,000 Angstroms. This film is either deposited through a mask to create the individual sensor strips or is first deposited in a localized area and then etched away to form the sensor strip pattern.

A tin oxide film ($SnO_2$:F) is preferably used to form the moisture sensor. This film is transparent, highly conductive and resistant to abrasion and removal from the window substrate. Tin oxide can be deposited via chemical vapor deposition through a mask.

Indium tin oxide can also be used to provide transparent, conductive strips. In this case, the composition is deposited by sputtering onto a localized area of the window and then subsequently selectively etched to form the sensor pattern.

According to yet another feature of the present invention, the control system receives wiper blade position information useful for determining whether the wiper blades are frozen in place by ice or other obstruction, allowing the control system to activate an "ICE ALARM" condition. This same position information is also useful for ensuring that the wiper blades are fully returned to the park position under certain conditions. Another feature of the present invention is a circuit which energizes the wiper motor briefly upon ignition cutoff, thereby allowing the control system to "KEEP ALIVE" the wiping motor power until the wiper blades are fully returned to the park position.

BRIEF DESCRIPTION OF THE DRAWINGS

These and other advantages of the present invention are best understood from the following detailed description of the preferred embodiments and the referenced drawings, wherein:

FIGS. 1A, 1B, 1C and 1D are functional block diagrams of four alternative embodiments of the present invention;

FIG. 5, comprising

FIG. 6, comprising FIGS. 6A and 6B, is a block diagram of a complete wiper control system according to the present invention;

FIG. 7, comprising

FIG. 8, comprising

FIGS. 12A and 12B, is a schematic diagram of an alternate multiplexing scheme which may be used with the present invention;

FIGS. 13A, 13B, 13C, 13D and 13E illustrate three different embodiments of a Hall-effect position sensor which may be used with the present invention;

FIGS. 14A, 14B, 14C illustrate two different embodiments of an optical position sensor which may be used with the present invention;

FIGS. 15A and 15B illustrate a capacitive proximity sensor embodiment of a position sensor which may be used with the present invention.

DESCRIPTION OF THE PREFERRED EMBODIMENTS

Figure 2:
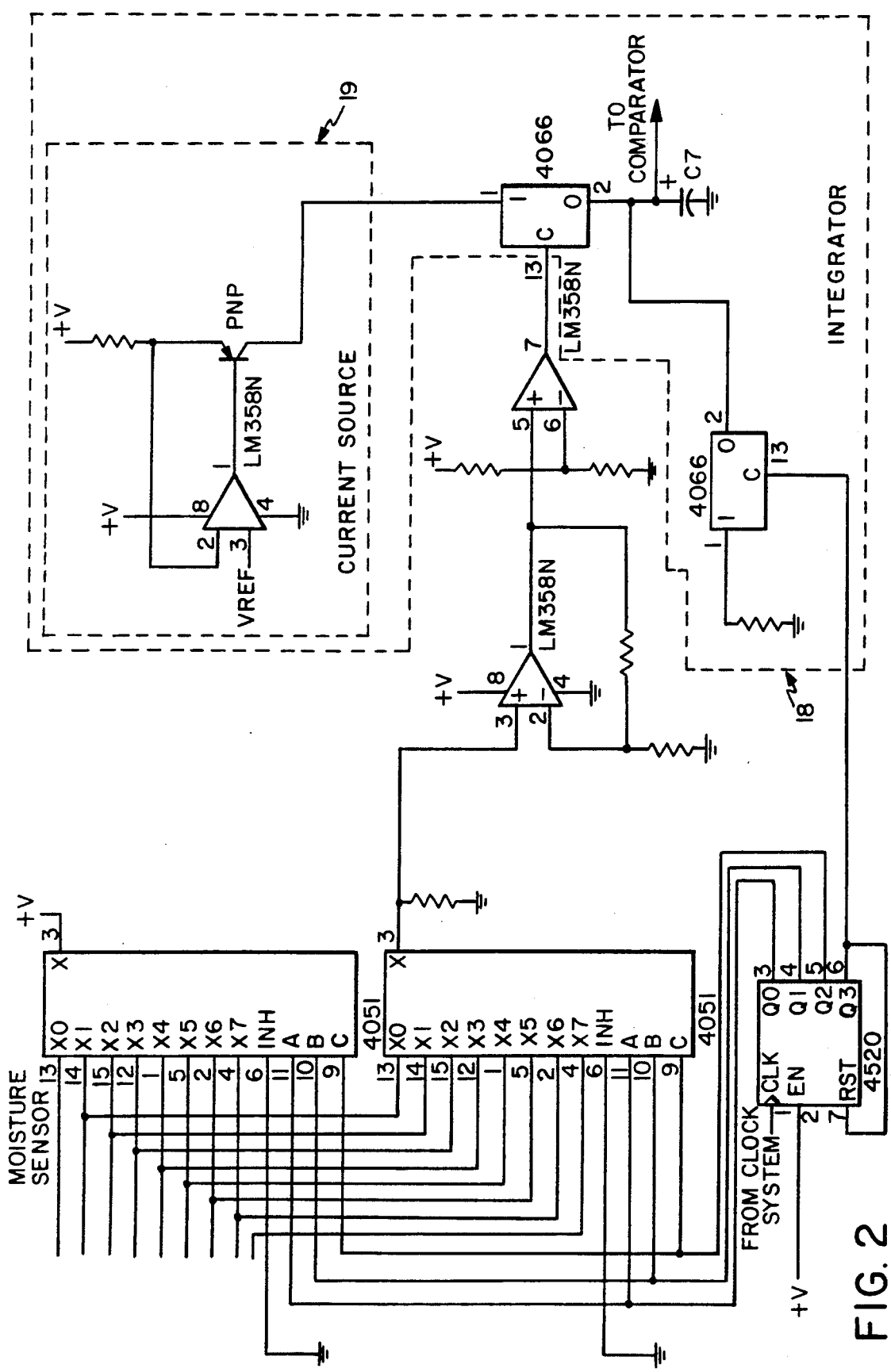
FIG. 2 is a schematic diagram showing the essential elements of an embodiment of FIG. 1A.

The preferred embodiments of the present invention will now be described with reference to FIGS. 1-16 of the drawings. Corresponding elements in the various figures are provided with the same reference numerals.

FIGS. 1A, 1B, 1C and 1D show four different, alternative embodiments of the present invention, all of which operate in accordance with the principals of the present invention to discriminate individual raindrops and actuate a device, such as a windshield wiper, a power window, a sun roof or a convertible top of a motor vehicle, when the number of raindrops which have fallen on a moisture sensor exceeds a prescribed threshold.

Figure 10:
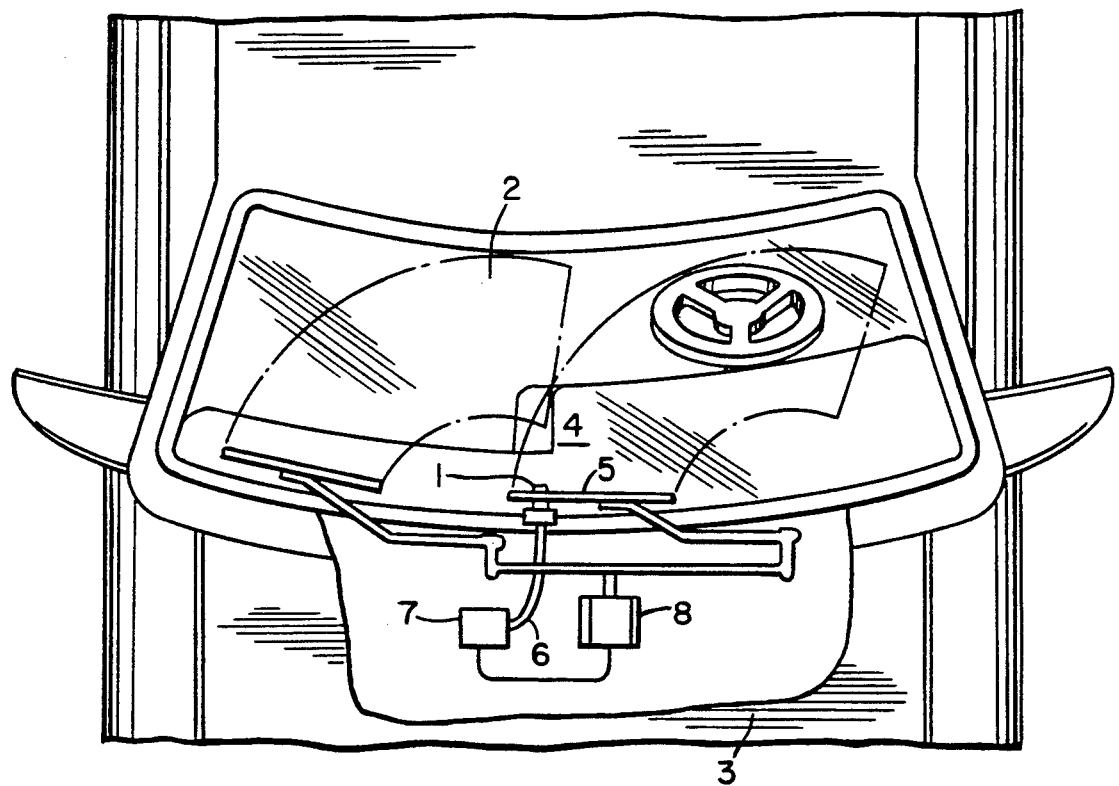
FIG. 10 is a top plan view of an automotive vehicle in partial cutaway showing the basic elements of the present invention.
Figure 11:
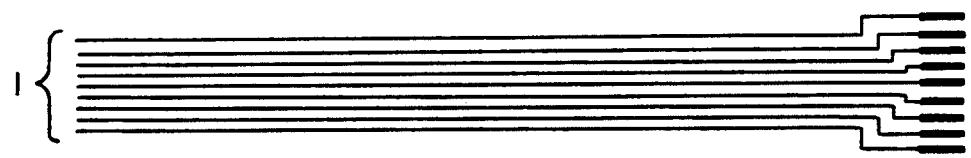
FIG. 11 is a plan view of a moisture sensor employed with the present invention.

As shown and described in the aforementioned U.S. Pat. No. 4,705,998, in connection with FIGS. 2 and 4, and as illustrated in FIGS. 10 and 11, the moisture sensor 1 comprises a plurality of side-by-side positioned, exposed conductive strips arranged on a glass substrate such as windshield 2 of a motor vehicle 3 in the wiping region 4 of a windshield wiper 5. The strips are individually connected via wires 6 to an electronic wiper control system 7. This control system is connected to, and operative to control, the windshield wiper motor 8. In the control system 7, successive pairs of these strips are connected, e.g. through a multiplexer, such that one element (strip) of each pair is connected to a voltage source (such as a 12 volt battery) and the other is connected to a control circuit to be described hereinafter.

Referring to FIG. 1A, the plural signals received from the sensor strip pairs on plural lines 10 are passed successively through a multiplexer 12 to a single line 14 and applied to a drop discriminator 16. Discriminator 16 can be a "Schmitt trigger" circuit which produces a prescribed voltage output, representing a logical "1" or "0" depending upon the convention used, if and only if the signal on line 14 exceeds a prescribed threshold. The output of discriminator 16 is passed to an integrator/filter circuit 18 which produces an output voltage representative of the rate at which the Schmitt trigger in discriminator 16 produces a logical "1" output. The output voltage of integrator 18 is passed to a comparator circuit 20 that produces an output signal that activates a device, such as a windshield wiper motor, when this voltage exceeds an adjustable threshold voltage 22.

Referring to FIG. 1B, this embodiment includes a plurality of drop discriminators 24, each connected to one of the sensor outputs on plural lines 10. The Schmitt trigger outputs of the drop discriminators each representing a logical "1" or "0", are applied in parallel to a multiplexer 26, which serializes the signals and applies them successively to a drop accumulation counter 28. A digital comparator 30 periodically compares the count appearing in counter 28 with an adjustable binary threshold number 32. If the count exceeds the threshold number, the comparator produces an output signal to activate an electrical device.

Referring to FIG. 1C, this embodiment includes a plurality of parallel drop discriminators 24 which receive plural signals from the sensor on lines 10. The output of each drop discriminator is divided down by voltage dividers 34 so that each output produces a prescribed small voltage on one of the output lines 36. Output lines 36 are applied to a voltage summing amplifier 38 which produces an output signal proportional to the sum of the individual voltages applied at its input. The output of summing amplifier 38 is applied to a voltage comparator 40 which compares it to an adjustable threshold voltage 42. If the output of summing amplifier 38 exceeds threshold voltage 42, comparator 40 produces an output signal to activate an electrical device.

FIG. 1D shows how a microprocessor 44 may be used to implement the control circuit according to the invention. Microprocessor 44 controls multiplexer 12 and synchronously senses the output of drop discriminator 16. Microprocessor 44 counts the logical "1" outputs from drop discriminator 16 over a prescribed period of time and produces an output signal when the drop rate exceeds a prescribed threshold. This output signal is amplified and supplied as an activation signal to an electrical device.

Embodiment of the essential elements of FIGS. 1A, 1B, 1C and 1D are illustrated in detail in FIGS. 2, 3, 4 and 5, respectively.

The circuit of FIGS. 1A and 2 comprise analog circuit elements. The capacitor C7 in the integrator 18 is either charged by the output of drop discriminator 16 or is allowed to decay, depending on whether a drop is present on the selected moisture sensor pair. A water drop present on a moisture sensor pair causes the voltage across capacitor C7 to rise during the time that multiplexer channel 14 is connected to the aft pair. When a moisture sensor pair without a water drop is selected by multiplexer 12, capacitor C7 is disconnected from current source 19 within the drop discriminator and thereby retains any previously accumulated voltage charge. After multiplexer 12 scans all moisture sensor pair input channels, a voltage or capacitor C7 representing the number of drops bridging the sensor pairs appears across the output of integrator 18.

As a voltage, this output is compared to voltage 22 representing a threshold quantity of precipitation. When voltage 22 is exceeded, a device activation signal is produced. After this comparison is made, capacitor C7 is quickly discharged so that the cycle can be repeated.

Figure 3:
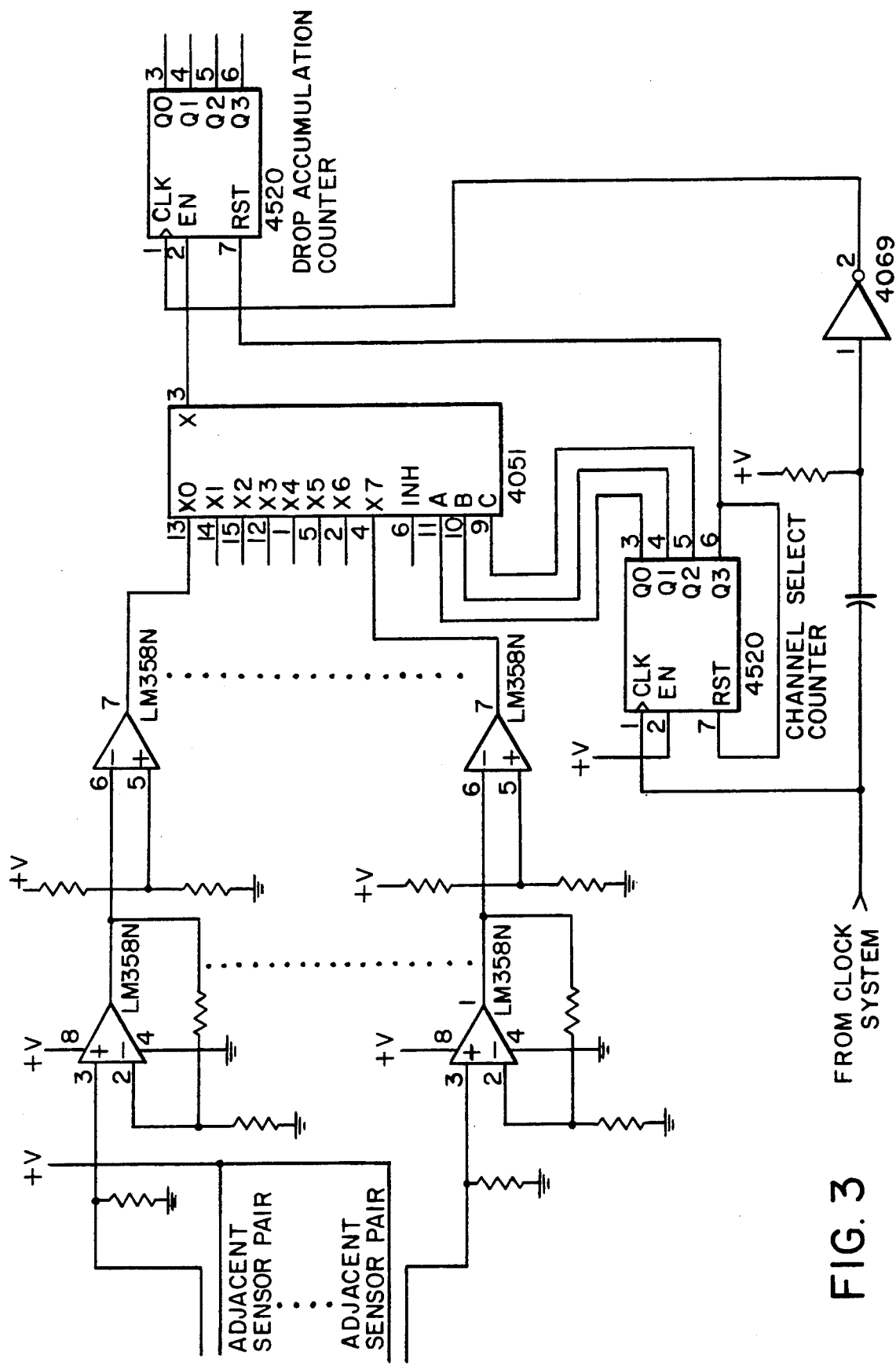
FIG. 3 is a schematic diagram showing the essential elements of an embodiment of FIG. 1B.

Referring to the circuit of FIGS. 1B and 3, it will be understood that where a voltage is accumulated on capacitor C7 in FIG. 1A to represent moisture, in FIG. 1B moisture is represented by a binary number which is counted or "accumulated". In this embodiment, the moisture sensor pair outputs are not multiplexed. Instead, the amplifier and comparator stages are provided for each sensor pair as shown in FIG. 3. The multiplexing and counting are done after the amplification and comparison stages.

Figure 4:
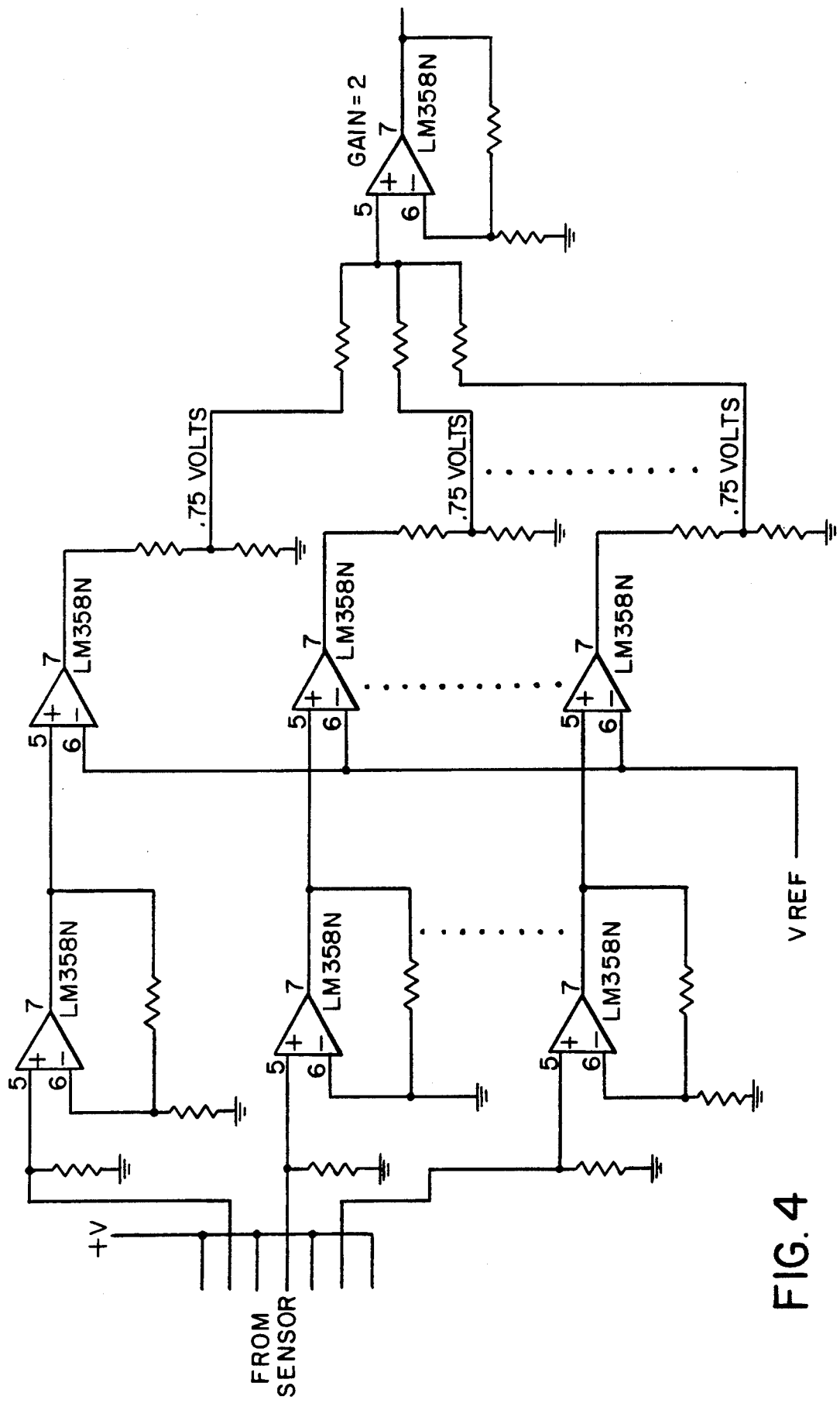
FIG. 4 is a schematic diagram showing the essential elements of an embodiment of FIG. 1C.

Multiplexing can be eliminated entirely by summing the voltage-divided output of several comparators, as shown in FIG. 1C and FIG. 4. The voltage output of the summing amplifier 38 is compared with a threshold voltage 42 in the manner described previously.

Figure 12A:
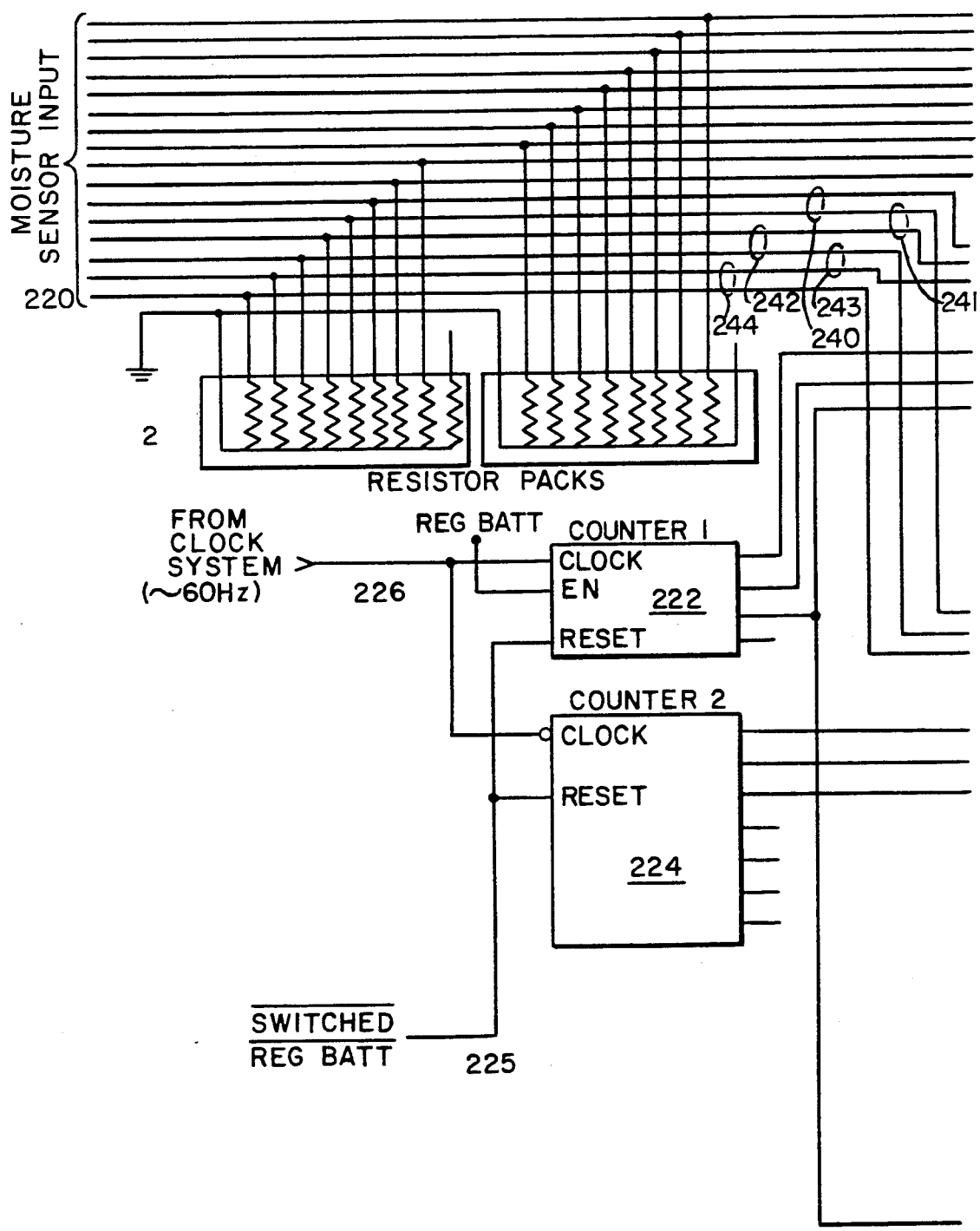
Figure 12:
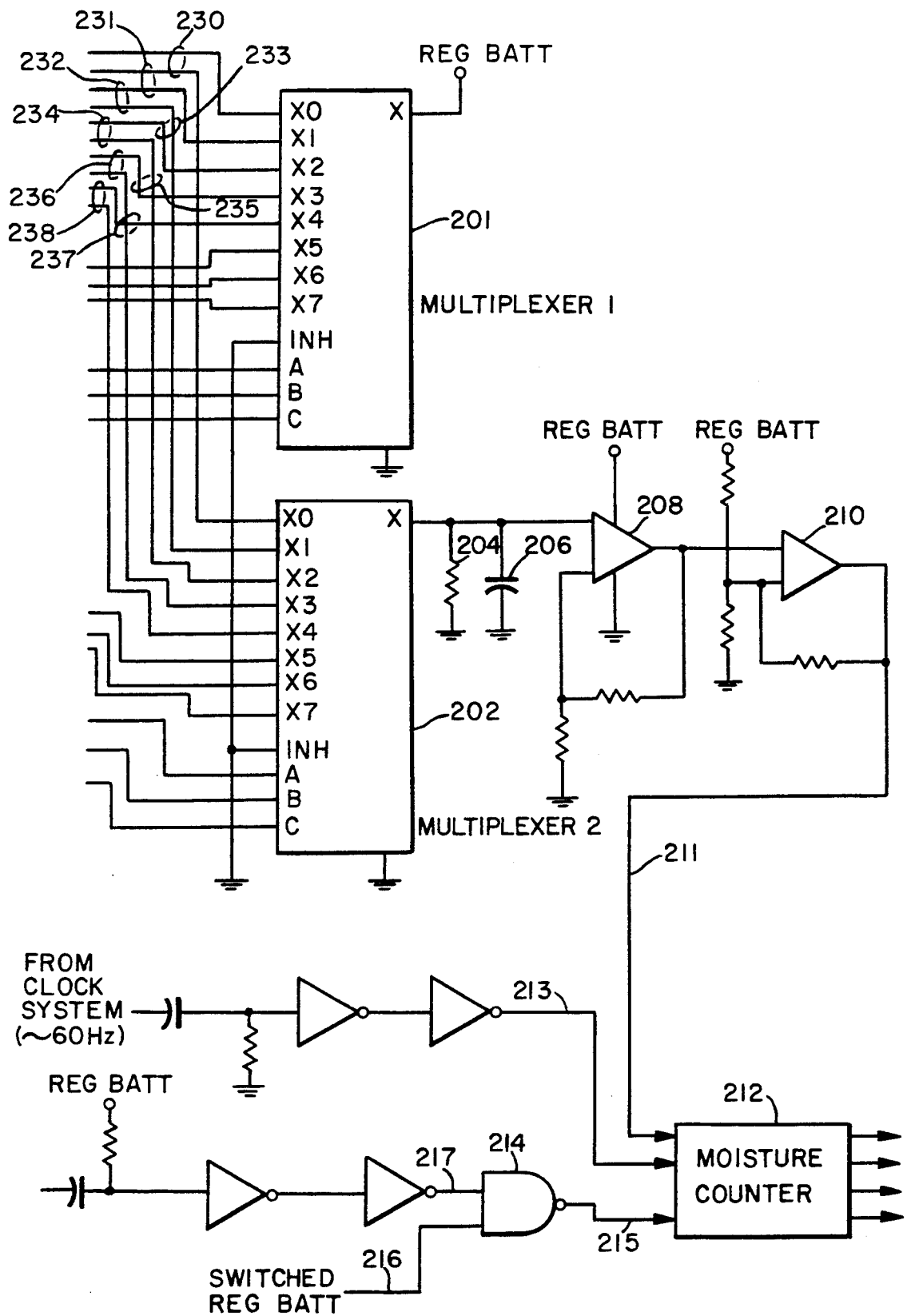
FIG. 12, comprising

An alternative multiplexing scheme is disclosed in FIG. 12 which has two advantages. First, when using two 8-channel analog multiplexers, up to sixteen moisture sensor channels can be scanned. Accordingly, for instance, eight sensor pairs 230 through 244 are each split between multiplexers 201 and 202. This scheme uses sixteen leads to form fifteen sensing pairs scanned in isolation from one another. This design is limited to fifteen pairs because the prop counter is limited to a count of $15_{10}$ (binary $1111_2$). When compared to the scheme disclosed in FIG. 5, where the eight sensor pairs comprise only nine leads, the alternative multiplexing scheme has the advantage of electrical isolation, reducing the possibility of false drop detection.

Figure 5A:
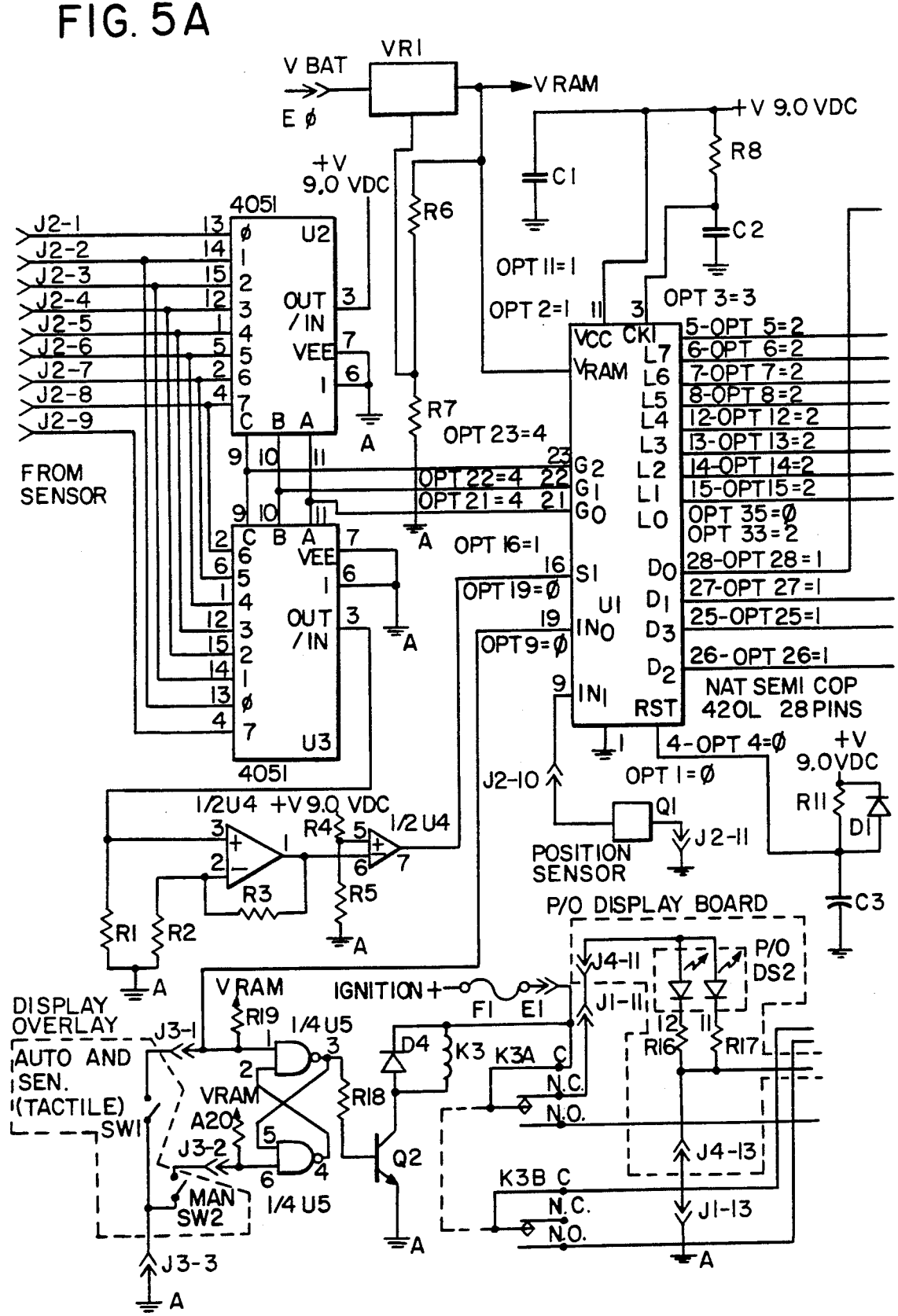
FIGS. 5A and 5B, is a schematic diagram showing the essential elements of an embodiment of FIG. 1D.
Figure 5B:
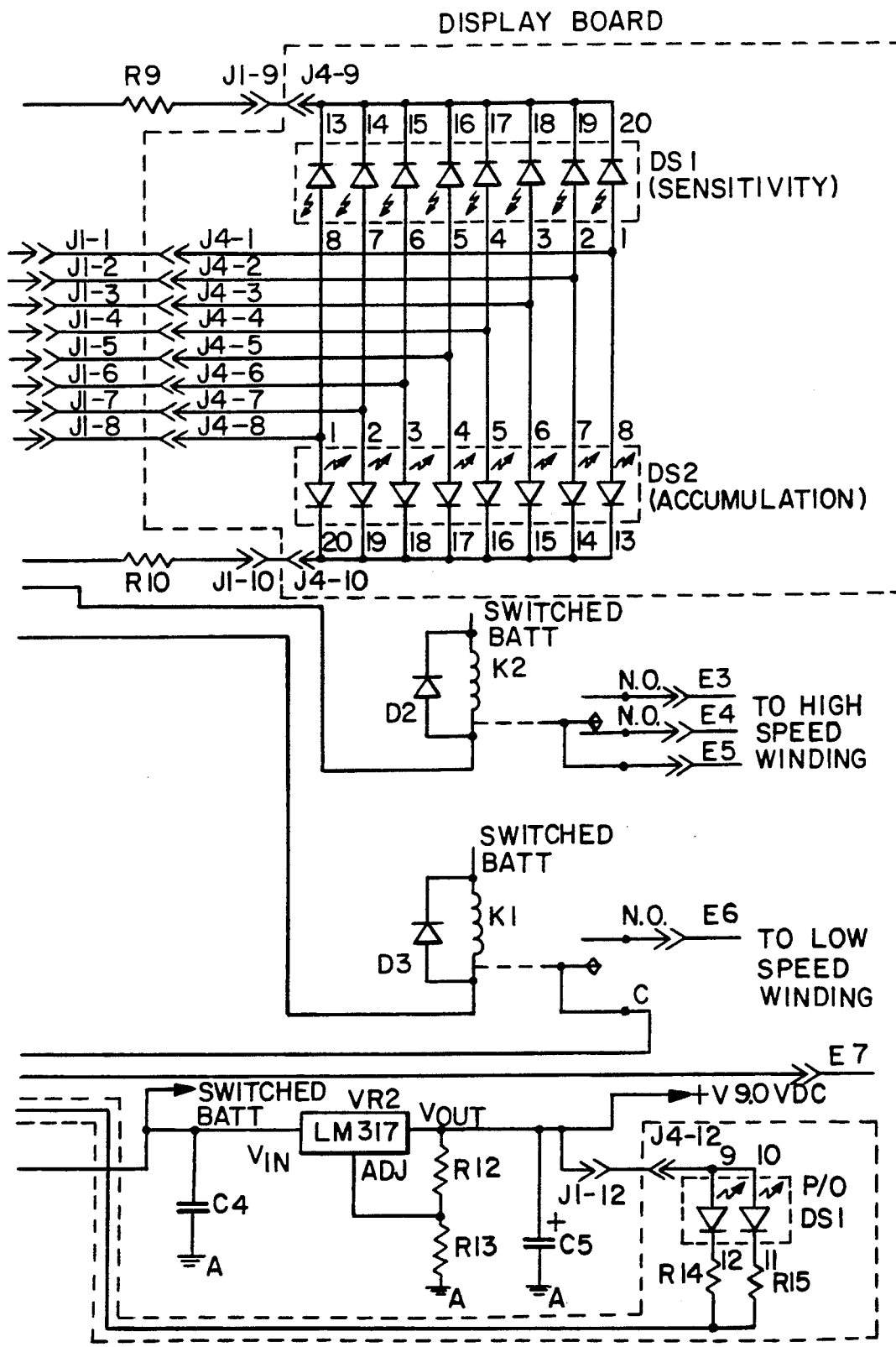

The most flexible approach is shown in FIGS. 1D and 5. Microprocessor 44 may be programmed to execute desired algorithm to optimize circuit operation. The detailed operation of the circuit in FIGS. 5A and 5B can be understood from the following discussion of FIG. 6 by those familiar with the electronic arts.

Figure 6A:
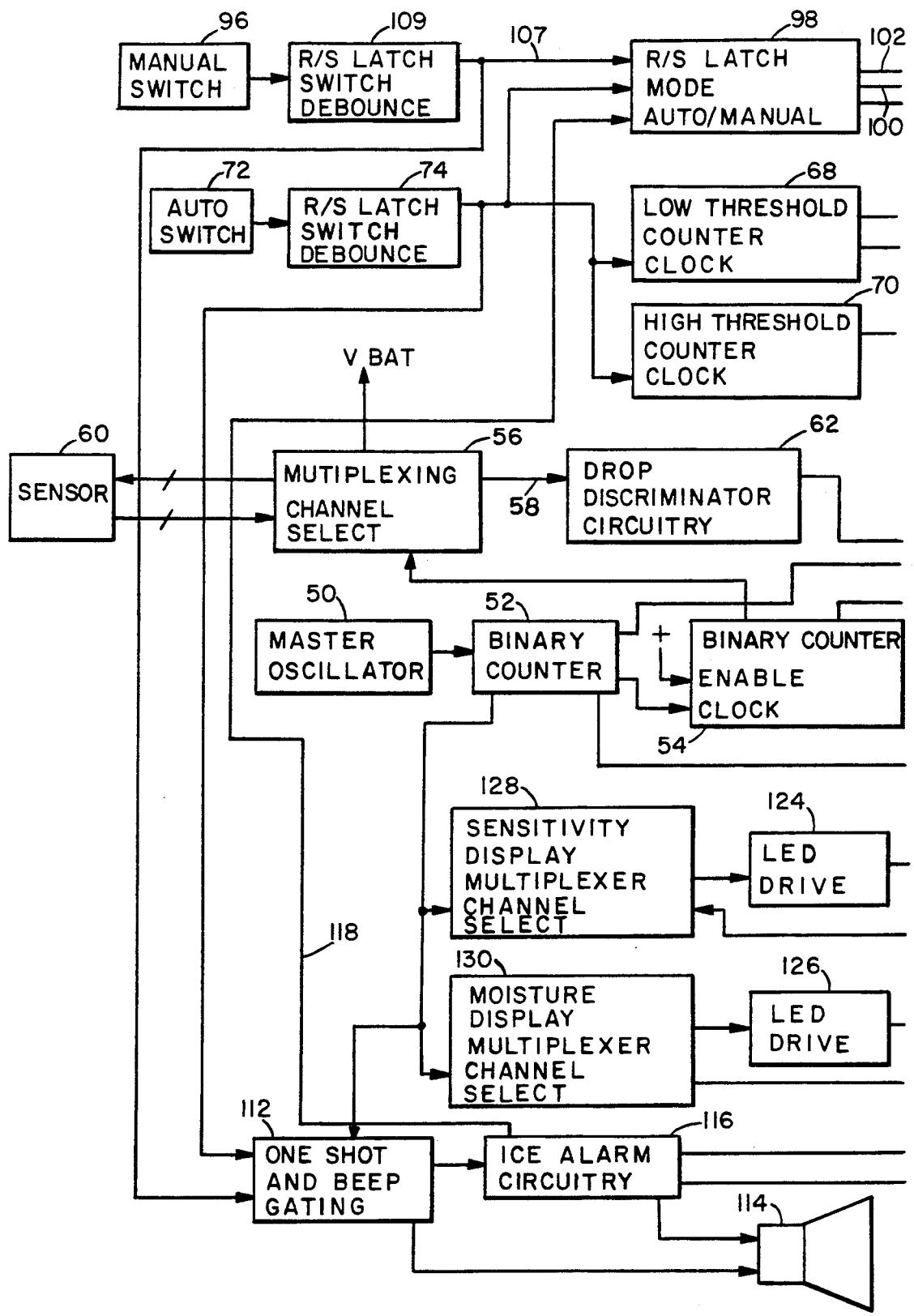

FIG. 6, which comprises FIGS. 6A and 6B, shows an entire control system for a motor vehicle windshield wiper. This system uses a single drop discriminator 62 in the manner that drop discriminator 16 is used in FIG. 1A. The circuit following drop discriminator 62 is similar to the circuit following multiplexer 26 in FIG. 1B. This is accomplished by placing multiplexer 56 ahead of discriminator 62 in FIG. 6A. Except for the analog multiplexers 56, 128, and 130 and Schmitt trigger drop discriminator 62, this circuit comprises only digital logic elements. Binary numbers stored in counters are used to represent precipitation accumulation. Binary numbers also represent a threshold quantity of precipitation that, when exceeded, produces a wiper activation signal. The following is a detailed description of this system.

The master oscillator 50 provides timing for nearly all of the controller's circuitry. The approximately 2 kHz square-wave output of oscillator 50 clocks a binary counter 52. Since binary counter 52 halves the master oscillator 50 frequency five times, the counter 52 output frequency is 62.5 Hz. This 62.5 Hz signal is used to clock binary counter 54 at its clock input.

The binary outputs of counter 54 connect to the channel select inputs of two analog multiplexers 56. Analog multiplexers 56 each have eight channels and can be individually selected depending on the binary number that is applied to their channel select inputs.

As each channel is selected, an electrical path is made between the single multiplexer output line 58 and the selected channel to the sensor 60. If channel "0" is selected on both multiplexers, current can flow from the battery VBAT through one multiplexer to sensor 60, through a raindrop (if present on that pair of sensor strips), and through the second multiplexer to line 58. Because of the way the multiplexers are interconnected at their inputs, successive channel selection causes successive adjacent pairs of sensor strips to be "scanned". As these adjacent sensor strips are scanned, the rain signal for each pair appears as a voltage on the output line 58. This output line is connected to drop discriminator circuit 62.

The voltage on line 58 is amplified by an amplifier within the discriminator 62, the gain of which is about 356. After the voltage has been amplified, it is compared against a fixed threshold voltage formed by a resister divider network comprising a pair of resisters connected in series to battery voltage VBAT. Since voltage VBAT of approximately 9 volts is divided in half, the threshold voltage is approximately 4.5 volts.

If the voltage from the output of the amplifier in discriminator 62 exceeds the threshold voltage, the output of drop discriminator 62 drops to zero or a value close to zero, depending upon the choice of integrated circuits. Conversely, if the output of the amplifier is less positive than the threshold voltage, the output of discriminator 62 switches to a voltage close to battery voltage VBAT.

Thus, the output of drop discriminator 62 is a digital signal which either enables or disables a drop accumulator counter 64. This signal is a logical "0" when rain is present on the scanned pair of adjacent sensor strips and is a logical "1" when rain is not present on the scanned pair of adjacent sensor strips.

The raindrop threshold resistance through a pair of adjacent sensor strips is preferably about 21 megohms; that is to say, a raindrop with a resistance of less than 21 megohms is assumed to be a raindrop, and anything higher in resistance than 21 megohms is assumed not to be a raindrop.

When a logical "0" is present at the enable input of drop accumulation counter 62, and a logical "1" to "0" transition occurs at the clock input, counter 62 is incremented by one count. If there are two drops bridging two pairs of sensor strips, drop accumulation counter 62 is enabled to count twice during the scan cycle. The binary number present at the plural outputs of this counter, after all moisture sensor channels have been scanned, is the number of bridged adjacent pairs on the sensor.

A reset pulse is applied to the reset input of drop accumulation counter 64, after every eight clock pulses, by a binary counter 54. Accumulation counter 64 can also be reset by "power-on reset" circuitry 66, which generates a reset only when the control circuit is initially connected to power.

To determine if the number of bridged pairs of adjacent sensor strips is sufficient to initiate a windshield wiper stroke, the binary output number from drop accumulation counter 64 is compared to a preset drop count. This preset number is provided by one or more registers or counters as will now be described.

In this example, low and high threshold counters 68 and 70, respectively, are employed to provide two preset numbers. Low threshold counter 68 supplies the preset binary number of bridged pairs of adjacent sensor strips that will initiate a wiper stroke. High threshold counter 70 supplies the preset binary number of bridged pairs of adjacent sensor strips that will initiate high speed wiper stroking.

Threshold counters 68 and 70 are presettable, up-down counters set to count only down. Each time the "AUTO" switch 72 is closed, a positive-going clock edge is generated that causes threshold counters 68 & 70 to count down by one. When a binary numerical value of zero is reached on low threshold counter 68, a carry-out is generated. Both counters are preset-enabled, which means that both counters are preset to binary numerical values that are "hard-wired" at their inputs. Counter 68 is wired for a preset binary value of $1000_2$ (Decimal $8_{10}$) and counter 70 is wired for a preset binary value of $1001_2$ (Decimal $9_{10}$).

As the counters 68 and 70 are clocked by "AUTO" switch 72, they count down from the preset numbers $8_{10}$ and $9_{10}$, respectively.

Switch bounce is removed by means of a nand gate latch 74. This prevents counters 68 and 70 from counting more than once when "AUTO" switch is pushed. A counting sequence is shown below:

| NUMBER OF PUSHES | LOW THRESHOLD COUNTER | HIGH THRESHOLD COUNTER |
|---|---|---|
| 1 | PRESET ENABLE | PRESET ENABLE |

-continued

| NUMBER OF PUSHES | LOW THRESHOLD COUNTER | HIGH THRESHOLD COUNTER |
| --- | --- | --- |
| 2 | 8 | 9 |
| 3 | 7 | 8 |
| 4 | 6 | 7 |
| 5 | 5 | 6 |
| 6 | 4 | 5 |
| 7 | 3 | 4 |
| 8 | 2 | 3 |
| 9 | 1 | 2 |
| 10 | 0 | PRESET ENABLE |
|  | 8 | 9 |
| 11 | 7 | 8 |

Zero is present for a few nanoseconds because a count of zero is what causes a preset enable.

After a low and high threshold is established in counters 68 and 70 and a binary number representing bridged pairs of adjacent sensor strips is stored in drop accumulation counter 64, a magnitude comparison is made to determine if wipers should turn on and if high speed operation should begin.

Referring to FIG. 6B, comparator 76 compares the binary number stored in drop accumulation counter 64 with the number stored in low threshold counter 68. If the number in drop accumulation counter 64 is less than the number in counter 68, the output of magnitude comparator 76 will be a logical "0". Conversely, if the number in counter 64 is greater than the number in counter 68, the output of magnitude comparator 76 will be a logical "1". Therefore, a logical "1" at the output of comparator 76 will initiate wiping of the windshield.

Comparator 78 compares the binary number stored in drop accumulation counter 64 with the number stored in high threshold counter 70.

The number in high threshold counter 70 is always greater than the number in low threshold counter 68. This larger number must then be exceeded by the number in drop accumulation counter 64 to initiate high-speed wiper operation. When the number in counter 64 exceeds the number in counter 70, the output of magnitude comparator 78 will be a logical "1". Therefore, a logical "1" at the output of comparator 78 will initiate high-speed wiper operation.

A dual "D" type flip-flop comprising four nand gates and wiper position sensor inputs 80 and 82 make up the motor drive logic 84.

When a logical "1" is present at the data input 86 of a flip-flop (not shown) and a transition from a logical "0" to a logical "1" occurs at flip-flop clock input 88, the logical "1" present at data input 86 is "clocked" over to the flip-flop output and through a resistor to cause an NPN transistor (not shown) within low speed motor drive circuitry 90 to conduct, thereby completing the ground path of a relay coil (not shown). The contacts of the relay close, thereby supplying current to the low-speed winding (not shown) of the wiper motor 91.

Similarly, when a logical "1" is present at data input 92 of a second flip-flop (not shown), and a transition from logical "0" to logical "1" occurs at second flip-flop clock input 88, the logical "1" present at input 92 is clocked over to the second flip-flop output causing the transistor within the high speed motor drive circuitry 94 to conduct, thereby completing the ground path of a second relay coil (not shown). The contacts of the second relay close, thereby supplying current to the high-speed winding (not shown) of wiper motor 91.

As the wiper blades move across the windshield, water accumulates and is pushed along. The wiper blade that wipes across sensor 60 will be directly on top of sensor 60 at some point during its sweep. At this time, the accumulated water that is being pushed along momentarily bridges across all the pairs of adjacent sensor 60 strips.

The purpose of the second wiper position sensor 82 is to ensure that this condition does not erroneously re-initiate a wiper cycle. When the wiper blade is on top of sensor 60, wiper position sensor 82 will output a logical "0", preventing any logical state changes in motor drive logic 84.

There are other useful approaches to solving this problem. One is to slow the multiplexer 56 channel selection rate so that even if all sensor 60 strips are bridged by accumulated water, the wiper blade will leave the strips before drop accumulation counter 64 can count high enough to re-initiate a wiper stroke. Another approach is to slow the data rise-time clocked into the motor drive logic flip-flop by adding an RC time-constant. Both of these methods, however, preclude the instantaneous operation provided by second wiper position sensor 82.

The first wiper position sensor 80 prevents the wipers from stopping at a slightly elevated position. During continuous operation, the park switch within the wiper motor is normally closed and no wiper position information is available to logic 84. Logic 84 must have this information for continuous operation because, when rainy conditions subside and logic 84 terminates operation, there is a possibility that the wipers will be just beginning a new stroke. This may leave the wipers slightly elevated, perhaps obscuring the driver's view, but not be high enough to close the park switch within the wiper motor which, if closed, would carry the wipers through another complete cycle and come to rest at the bottom of the windshield without involving logic 84. With sensor 80 input to logic 84, wiper operation to will halt only after first wiper position sensor 80 signals that the wiper blades are at the top of the wiper stroke. This ensures proper action of the park switch in the wiper motor.

Figure 13C:
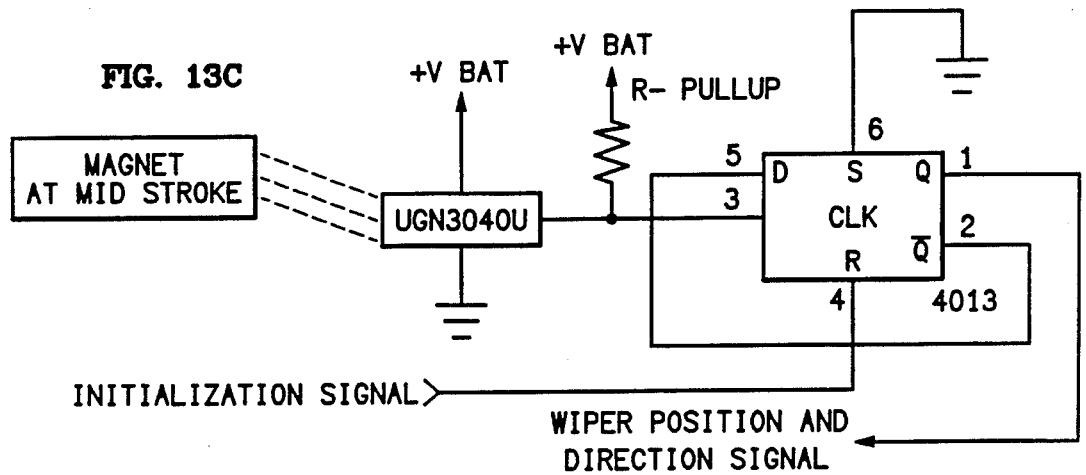

In this design, illustrated in FIG. 13A, both position sensors are 80 and 82 are SPRAGUE Hall-effect switches, part number UGN 3019T. When the magnet that is mounted at the base of the wiper arm comes within close proximity of either Hall-effect switch, as illustrated in the block diagram in FIG. 13C, electron current flows through that switch, through a corresponding pull-up resistor to VBAT. This provides a logical "0" to the associated logic. An alternative embodiment using a single sensor is shown in FIG. 13B, requiring a different control logic to provide the benefits of two sensors. Still another embodiment using a linear Hall-effect sensor is shown in FIG. 13D, which could use a reference voltage decoding logic such as that suggested in FIG. 13E. FIG. 13C also illustrates how wiper direction may be sensed, in addition to position sensing, by use of a data-type flip-flop in the manner shown.

Figure 14C:
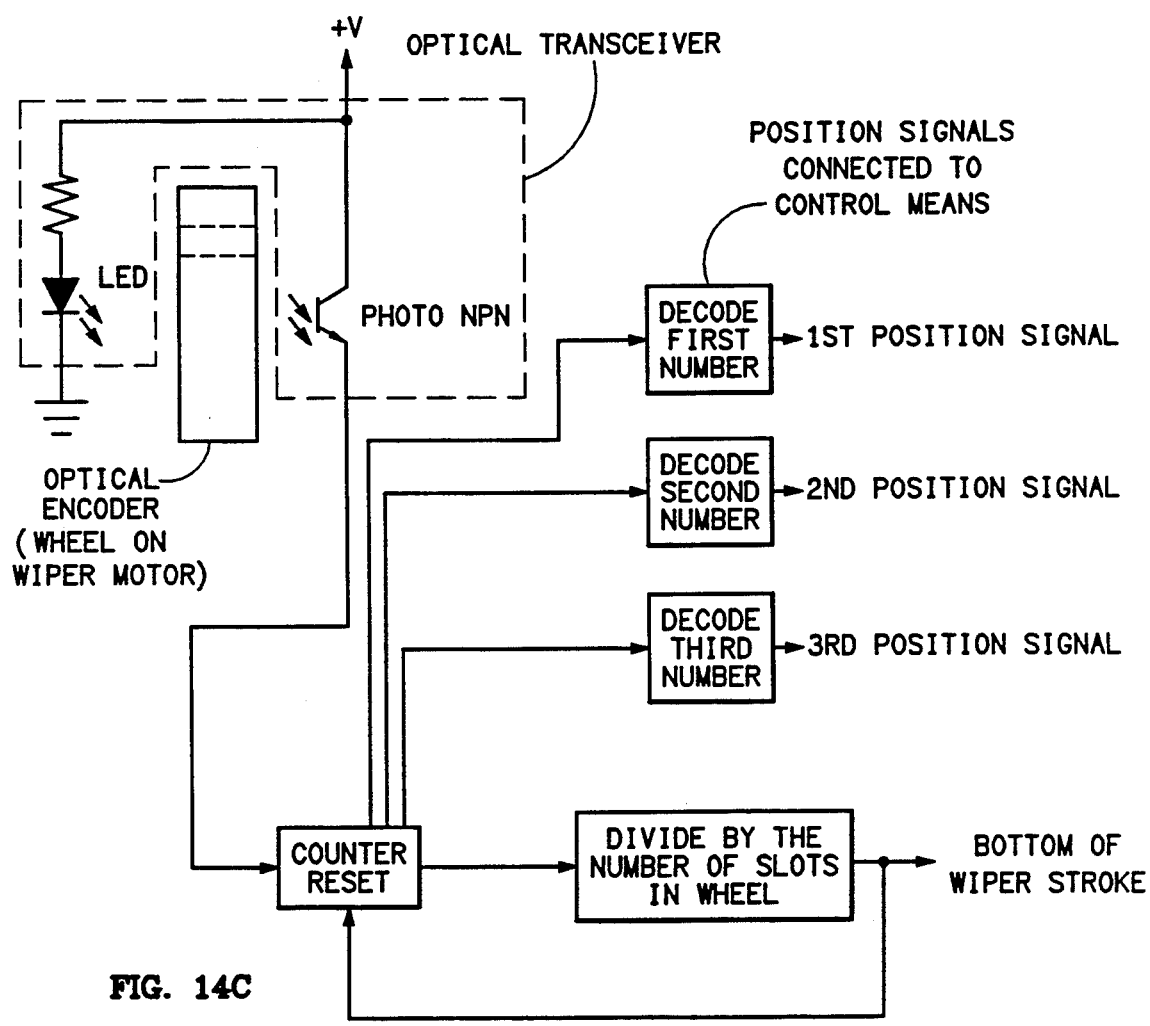
Figure 14A:
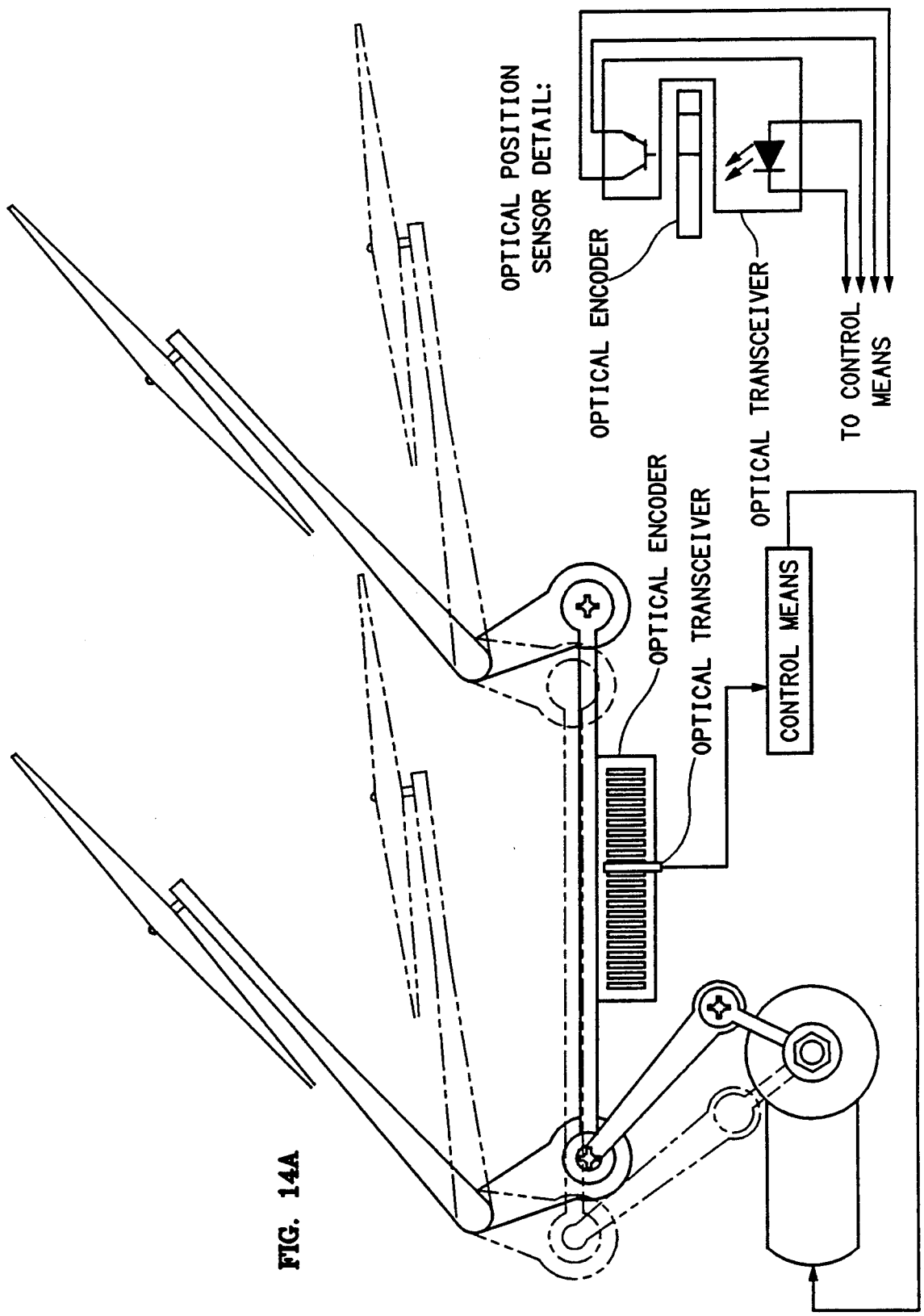

FIG. 14 discloses an optical encoding embodiment of the two position sensor functions. In FIG. 14A, a slotted mask is moved in synchronization with wiper blade movement, generating a digital pulse train and transmitting it to a control means. Such control means can compute wiper position using methods known in the electronic arts. FIG. 14B uses a similar optical encoding scheme which relies on a pulse train generated by a circular slotted mask mounted on the rotary wiper motor. This scheme provides position and direction information. The control means for the embodiment in FIG. 14B can be realized as shown in the simple decoding block diagram of FIG. 14C.

Figure 15B:
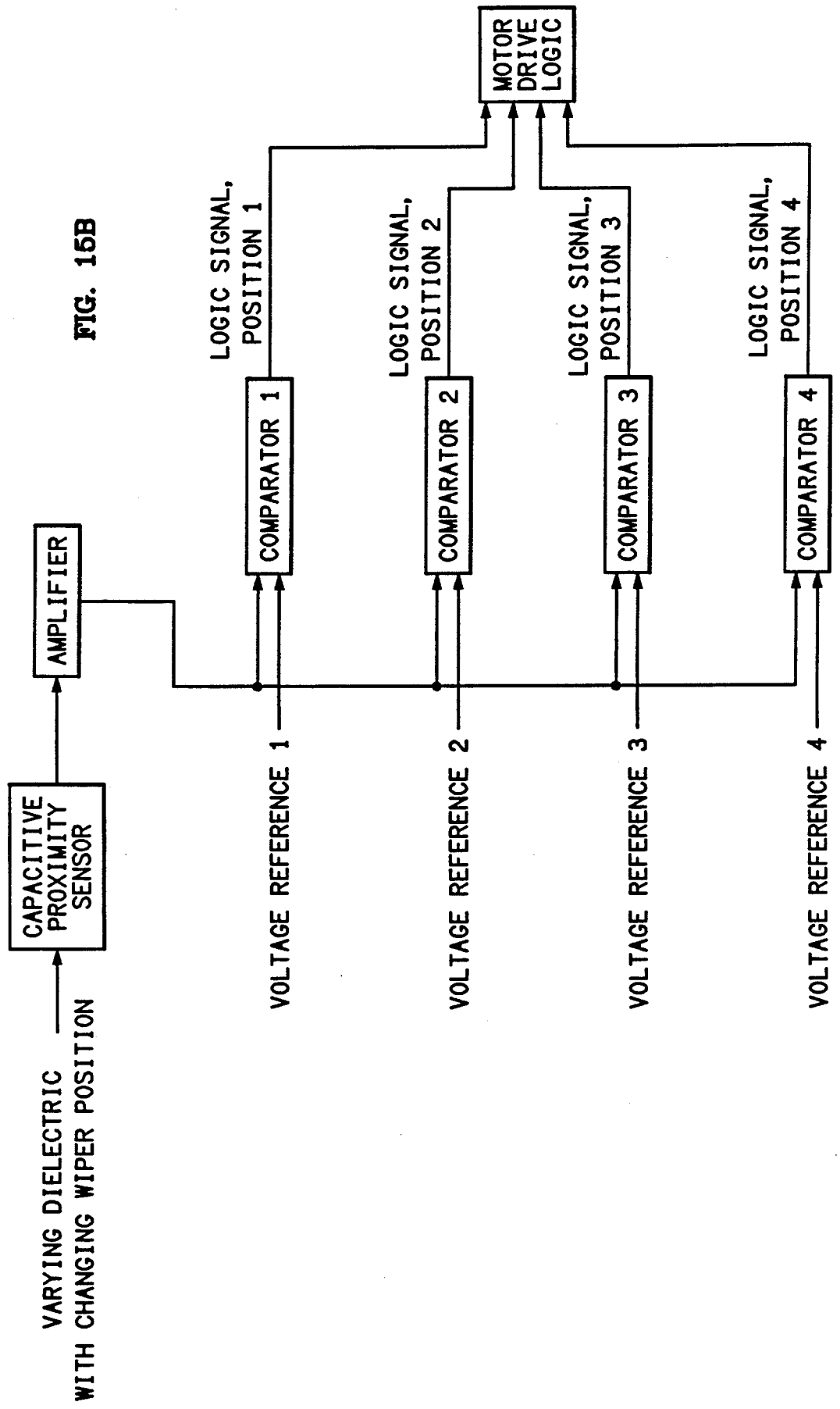

FIG. 15 discloses a capacitive proximity sensor embodiment of the two position sensor functions. In FIG. 15A, a sensor is used to detect the change in distance between sensor and wiper drive arm as the wiping cycle continues. FIG. 15B discloses a simple embodiment of a decoding scheme useable with a capacitive proximity sensor position detector. All of the disclosed sensor means are suitable for use with the present invention.

Figure 16:
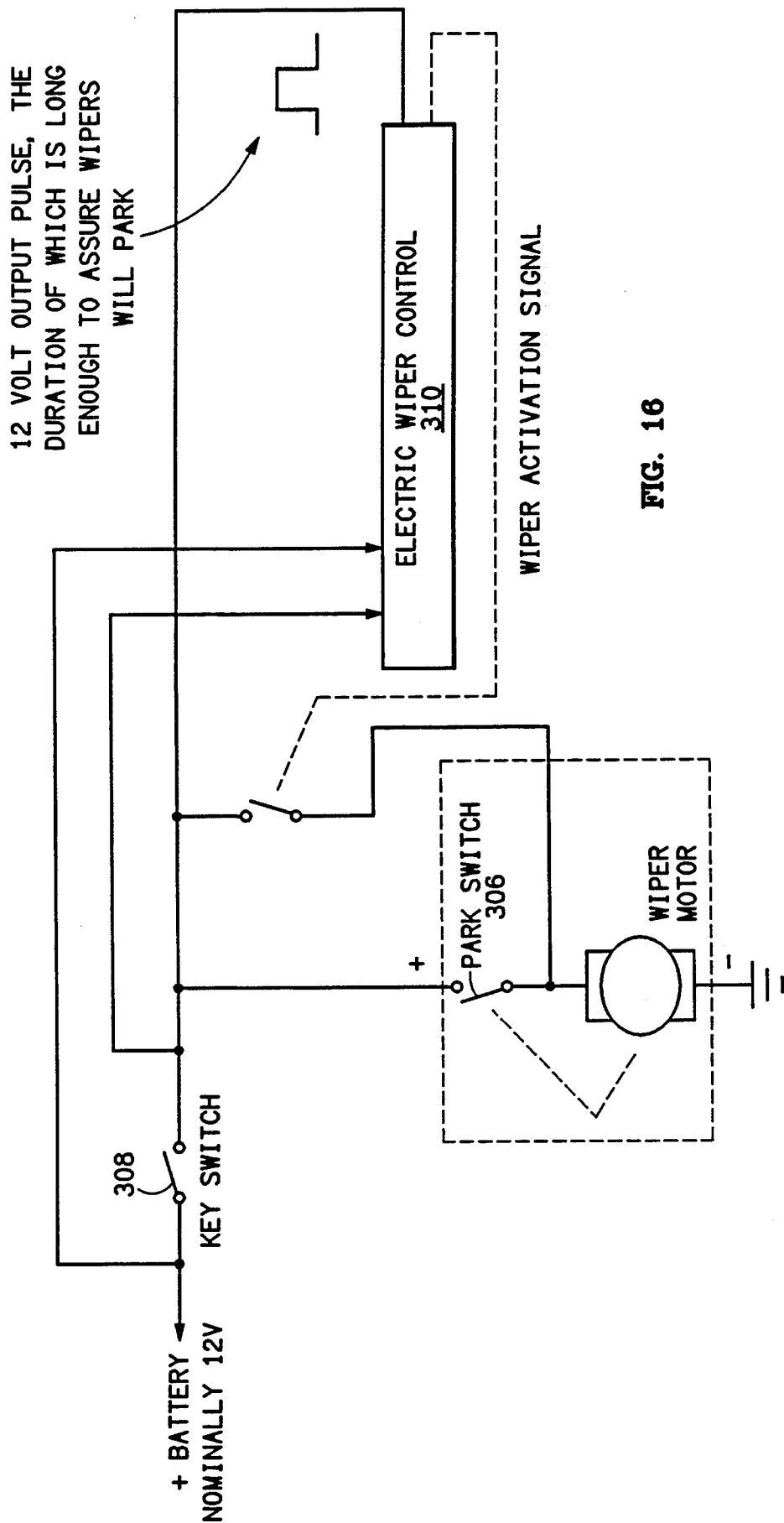
FIG. 16 is a functional block diagram of a "KEEP-ALIVE" circuit which may be used with the present invention.

FIG. 16 shows an illustrated embodiment of a "KEEP ALIVE" feature of the present invention, which is a circuit that energizes the wiper motor briefly upon ignition cut-off, thereby allowing the control system to "KEEP ALIVE" the wiping motor power until the wiper blades are fully returned to the park position. This "KEEP ALIVE" circuit causes the wiper blades to park, even when the ignition key switch is opened during a wiper stroke. Electronic wiper control 310 senses when the ignition key switch 308 has been opened and provides a 12 volt output pulse that is long enough to permit wiper blade parking. This 12 volt output pulse energizes the wiper motor through the park switch 306 shown in FIG. 16.

Manual or automatic mode can be selected by pushing either the MANUAL switch 96 or the AUTO switch 72. When switch 72 is pushed and released, a logical "0" is momentarily applied to a latch 98 via switch debounce latch 74. This causes latch 98 to hold a logical "0" on output line 100 and a logical "1" on output line 102. The logical "0" causes an LED 104 to illuminate orange, indicating the unit is in automatic mode. The LED+ supply, through an LED driver 106, powers the sensitivity and moisture accumulation displays.

When switch 96 is pushed and released, a logical "0" is momentarily applied to line 107 via a switch debounce latch 109. This causes latch 98 to hold a logical "1" on line 100 and a logical "0" on line 102. The logical "0" causes an LED 108 to illuminate green, indicating the unit is in manual mode.

When manual mode is selected, the logical "1" on output line 110 resets both flip-flops in motor drive logic 84. With the flip-flops held reset, logic 84 cannot initiate wiper operation.

Because of the lockout function provided by latch 98, the manual mode and automatic mode cannot be selected simultaneously.

When either the manual or automatic mode switch is pushed a signal is applied to a speaker circuit 112 which also receives the 2 kHz master oscillator 50 signal. This gates a short beep to the speaker 114.

If logic 84 has not initiated a wiper stroke, then output of first position sensor 80 is a logical "0" and a logical "1" resets the seven-stage binary counter 116. If a wiper stroke is initiated, the logical "1" at the output of first position sensor 80 removes the reset at counter 116, which begins to count. If counter 116 continues to count, its output will eventually switch to a logical "1", causing an ICE ALARM. This will not happen when the wipers are in motion because first position sensor 80 is activated once per wiper sweep and second position sensor 82 is activated twice per wiper sweep. Wiper position sensors 80 and 82 will periodically reset counter 116, preventing the triggering of an ICE ALARM. If a wiper cycle is initiated and the wiper arms cannot move, wiper position sensors 80 and 82 will not toggle and binary counter 116 will eventually count to a decimal $64_{10}$ (binary $10000000_2$) and produce the ICE ALARM.

Most of the same circuitry is used to produce the ICE ALARM beeping sound as is used in producing the manual/auto beep. When the ICE ALARM is triggered, the auto/manual latch 98 is set to MANUAL. As a result, a logical "1" is forced at output 110 of latch 98, which resets motor drive logic 84 in the same way as a push on the manual button 96.

The displays for sensitivity and moisture are configured such that each display uses eight light emitting diodes (LEDs). Both LED displays 120 and 122 are driven by transistor drivers 124 and 126, respectively. In the configuration shown, sensitivity display 120 is orange and moisture display 122 is green.

Sensitivity display 120 is a representation of the binary number stored in low threshold counter 68. If a binary $0011_2$ (Decimal $3_{10}$) is stored in counter 60, then three orange LEDs will illuminate and at least four sensor pairs must be bridged to initiate low speed wiper operation.

Both displays 120 and 122 are multiplexed, so although the LEDs may appear to illuminate simultaneously, they are actually illuminating sequentially. Binary counter 52 drives the channels selection activity of analog multiplexers 128 and 130.

The sensitivity display is configured such that as multiplexer 128 sequentially selects an LED channel, magnitude comparator 132 determines if the selected LED will be illuminated by comparing low threshold counter 68 with the LED channel number. If low threshold counter 68 number exceeds the current LED channel number, then magnitude comparator 132 produces a logical "1" at its output. The logical "1" causes current to flow through the selected LED channel, supplying base current to the transistor driver 124. This transistor conducts electron current from ground through the transistor and an LED. Refer to the following chart where a binary $0101_2$, (Decimal $5_{10}$) is stored in low threshold counter 68:

| Multiplexer 128 (CHANNEL SELECT) | DECIMAL | MAGNITUDE COMPARATOR BINARY OUTPUT 132 | LED ON? |
|---|---|---|---|
| 0 0 0 | 0 | 1 | YES |
| 0 0 1 | 1 | 1 | YES |
| 0 1 0 | 2 | 1 | YES |
| 0 1 1 | 3 | 1 | YES |
| 1 0 0 | 4 | 1 | YES |
| 1 0 1 | 5 | 0 | NO |
| 1 1 0 | 6 | 0 | NO |
| 1 1 1 | 7 | 0 | NO |

The moisture display is arranged so that the number of bridged sensor 60 pairs is equal to the number of illuminated LEDs. This display 122 works the same way as sensitivity display 120 except that drop accumulation counter 64 determines the number of green LEDs illuminated. Since drop accumulation counter 64 is constantly recounting and resetting, display flicker is avoided by latching the output of counter 64 with a 4-bit D-type register 136.

Figure 7A:
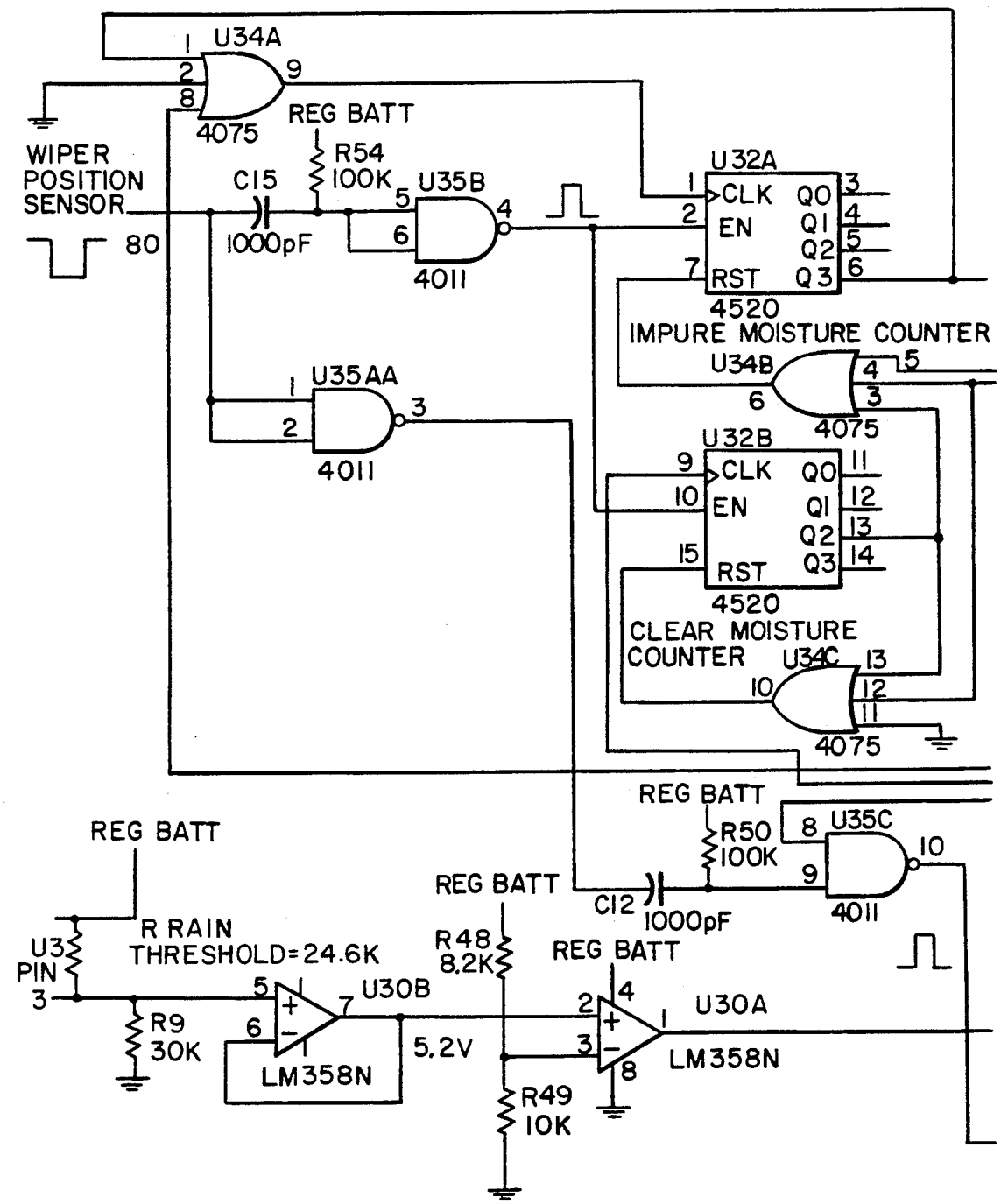
FIGS. 7A and 7B, is a schematic diagram of a water impurities detection circuit which may be used with the present invention.
Figure 7B:
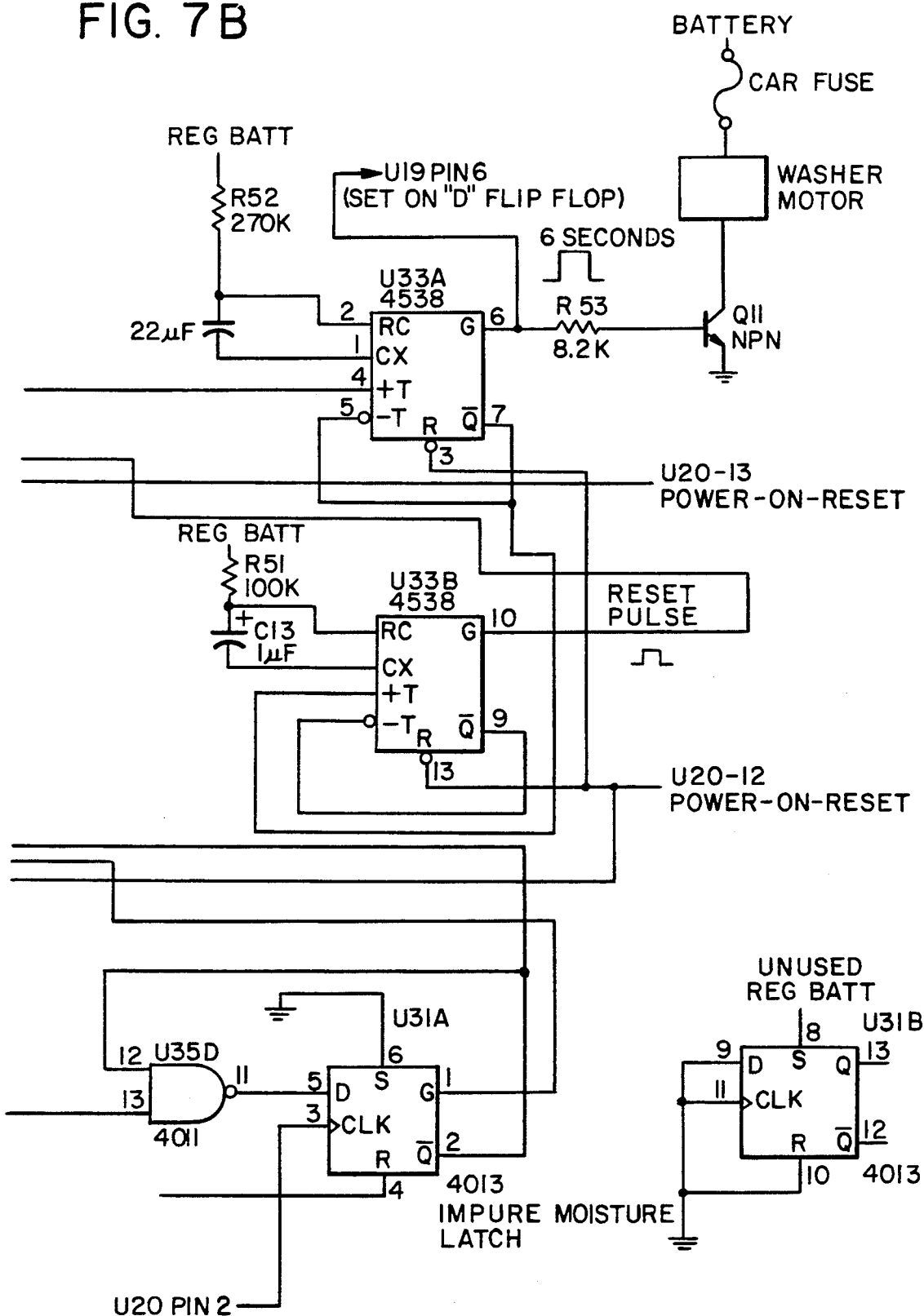
Figure 8A:
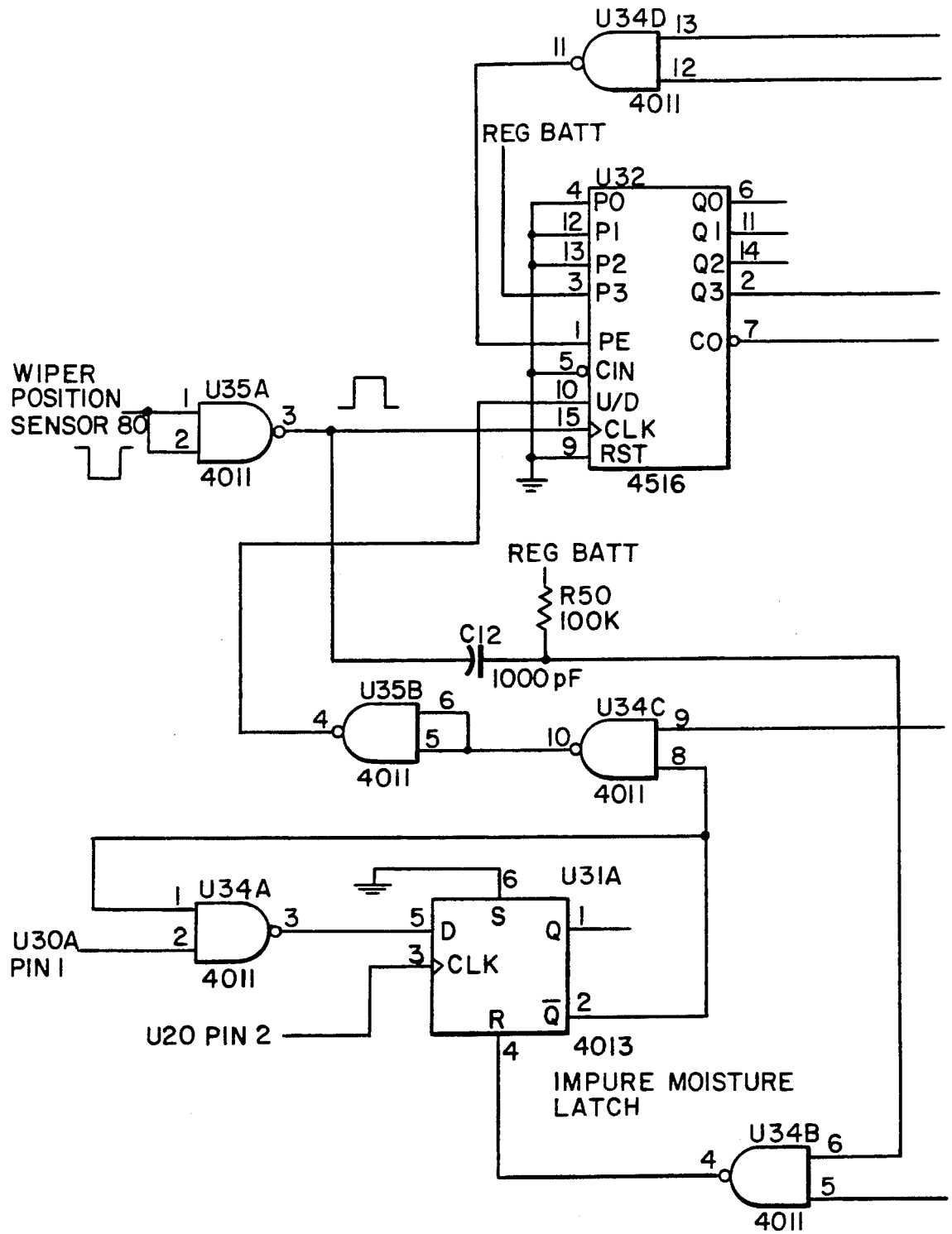
FIGS. 8A and 8B, is a schematic diagram of an alternate water impurities detection circuit which may be used with the present invention.
Figure 8B:
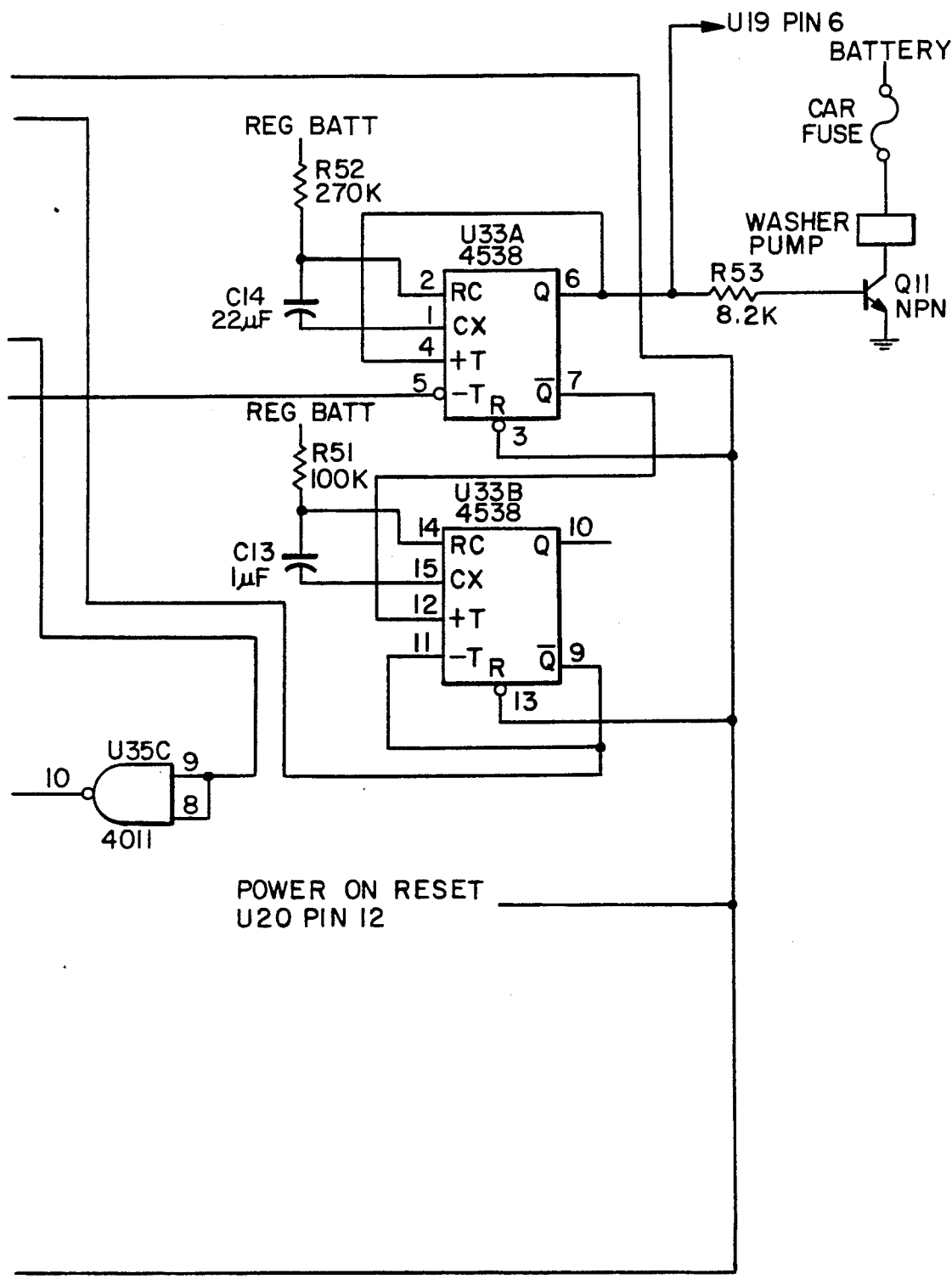

The impurities detection circuit of FIGS. 7 and 8 is useful in detecting moisture which contains certain impurities that would require activation of the washer pump mechanism (standard on most cars). This feature can easily be included as an integral part of the wiper control circuit previously described.

The detection circuit works on the principle that moisture which contains impurities has a lower resistance value than pure rain or snow. Impurities are most likely to be present in moisture from backsplash which is moisture on the road surface picked up by tires and thrown onto the windshield. This moisture mixes with road surface impurities such as oil, road salts, and dirt and may form a "slime" that can only be removed by activating the window washer pump along with the windshield wipers. Moisture mixed with road salts (prevalent in the East) is easy to detect because the salt causes the resistance of the moisture to radically decrease (increasing conductance.)

Whenever backsplash occurs, a certain amount of oil will accompany it. The oil in the moisture is what requires the activation of window washers and wipers, but the circuity detects the impurities present in the moisture and not the oil itself.

The following is a description of the detection circuit. Moisture sensor 10 used in the window wiper control circuit can also sense the aforementioned impurities. A second sensor is not needed. Once impure moisture is detected in enough quantity to activate the wipers, a wiper strokes count is made. If the impure moisture remains on the sensor after a preset number of strokes, it shows that the wipers cannot remove the moisture because of the impurities mixed with it (oil, dirt, road salts, etc). The washer pump and the wipers are then activated. The wiper stroke count may reach the preset number merely because impure moisture continues to be thrown onto the sensor and not because it cannot be wiped off. In such instance, the washer pump activation is still beneficial in preventing a buildup of impurities.

If the preset number of strokes is not counted, the washer will not activate. A second preset number of strokes counted in the presence of clean moisture resets the dirty stroke count to zero. The following is a detailed description of the circuitry.

The impurities detection circuit uses circuitry similar to that used in drop discriminator circuit 62 described above. Referring to FIG. 7, U30B and U30A comprise an amplifier and comparator circuit, respectively. Amplifier U30B, however, is used as a buffer (gain of 1) and comparator U30 has a threshold of approximately 5.2V.

$R_{rain}$ (the moisture resistance) and R9 form a voltage divider. The voltage at pin 7 of U30B depends on the value of $R_{rain}$. An $R_{rain}$ value of approximately 24.6 k$\Omega$ or less causes the voltage at U30B pin 7 to exceed the 5.2V threshold, thereby producing a logical "0" at U30A pin 1. This logical "0" represents impure moisture present on sensor 60. The logical "0" forces a logical "1" at the data input of flip-flop U31A (impure moisture latch). This logical "1" is clocked over to the high output of flip-flop U31A thereby disabling clean moisture counter U32B and also enabling impure moisture counter U32A by way of 3-input-OR gate U34A. The low output of impure moisture latch U31A is a logical "0" that is fed back to nand-gate U35D pin 12 to force a logical "1" on the data input of U31A, thus latching a logical "1" on the high output. The logical "1" will remain latched until a reset appears at pin 4 of U31A. If sufficient moisture is present on sensor 60 to activate the wipers, first wiper position sensor 80 then produces a positive pulse at U35B pin 4, the negative edge of which clocks the enable impure moisture counter U32A pin 2. As the wipers move away from the top of their stroke, a negative edge is coupled over to U35C pin 9, producing a positive reset pulse at flip-flop U31A pin 4 (impure moisture latch). If the impure moisture conditions still exist, a logical "1" will again enable impure moisture counter U32A. So, if and when the wipers reach the top of their stroke, U32A pin 2 receives a clock signal, causing the impure moisture counter U32A to count again (count now equals Decimal $2_{10}10$). Again, when wipers move away from the top of their stroke, a reset pulse appears at impure moisture latch U31A pin 4.

It can be seen that the circuit evaluates on a perstroke basis whether or not impure moisture has fallen on sensor 60. If it has, the number stored in impure moisture counter U32A increases by one (if and when wipers reach the top of their stroke) until decimal $8_{10}$ is reached (binary $1000_2$). At this time, the Q3 output of U32A switches to logical "1", thus triggering monostable U33A to produce an output pulse, the duration of which is dependent on the RC time-constant of R52 and C14 (about 6 seconds). This pulse, through R53 and Q11, turns on the washer pump. The pulse also sent to U19 pin 6, which ensures wiper activation for the pulse duration. At the end of the pulse, monostable flip-flop U33B is triggered, producing a reset to impure moisture counter U32A through 3-input OR-gate U34B.

It can be seen that so long as impure moisture is present on sensor 60, the impurities detection circuit produces a wash cycle every eight wiper strokes.

Whenever impure moisture counter (U32A) is enabled, clean moisture counter (U32B) is disabled and the converse is also true. Therefore, while enough clean moisture is present on sensor 60, clean moisture counter U32B counts until decimal $4_{10}$ is reached (binary $0100_2$). At this time the Q2 output of U32B will switch to a logical "1", resetting through 3-input OR-gate U34B. It is assumed that since clean moisture has been present on the sensor while the wipers have been stroking, impurities have been washed away and impure moisture counter U32A should be reset. This requires impure moisture counter U32A to count 8 times (one count per wiper) when next impure moisture is present on sensor 60. This prevents the impure moisture counter U32B from finishing a count to produce a washer cycle energy because of a nonzero count already stored. A full eight counts is required to respond to a "slime" build-up.

U34B pins 4 and 12 receive a power-on-reset pulse from U20 pin 13. U35C pin 8, U33A pin 3 and U33B pin 1-3 receive a power-on-reset "not" pulse from U20 pin 12. This ensures initialization of all impurities detection logic when battery power is first applied.

The same basic principle is used in the alternate impurities detection circuit of FIG. 8 as in the impurities detection circuit described above in connection with FIG. 7.

The impure moisture latch U31A and nand-gate U34A operate in the same way as described in the circuit of FIG. 7. Monostable flip-flop U33A controls washer pump cycle on-time as before. $R_{rain}$, R9, U30B and U30A are not shown in the schematic but are used as described previously (input to U31A pin 3).

The main difference is that a single 4-bit up-down counter (4516) is used for U32 instead of a dual binary up-counter (4520). A decimal count of $8_{10}$ (binary $1000_2$) is initially preset into the counter U32 when a positive pulse appears at pin 1 of U32 (preset enable). A binary $1000_2$ is preset because inputs P3 through P0 are hard-wired to $1000_2$.

When impure moisture is present on the sensor, the lower output of impure moisture latch U31A is latched to a logical "0". This logic level, through nand-gates U34C and U35B, enables up-down counter U32 to count down. Although enabled to count, it actually counts only when the wipers reach the top of their stroke and first wiper position sensor 80, through U35A, produces a positive clock edge at clock input U32 pin 15. Each time the wipers move away from the top of their stroke a negative edge is coupled over to U34B pin 6 by way of C12 and R50. This produces a reset pulse at U31A pin 4, allowing the resistance comparator circuit to re-evaluate the presence of impure moisture at sensor 60. When the wipers reach the top of their stroke while impure moisture is present on the sensor, U32 will decrement. When a count of zero is reached, carry out output pin 7 of U32 will switch to a logical "0", triggering monostable flip-flop U33A and starting a washer cycle by way of R53 and Q11. The output pulse that turns on the washers is also connected to U19 pin 6 (data input of the flip-flop that turns on the wipers) to ensure wiper operation during washer cycle.

At the end of the washer cycle, U33B is triggered to produce an output pulse, the duration of which is dependent on the RC time-constant of R51 and C13. This pulse, through U34D, presets counter U32 back to a count of decimal $8_{10}$ (binary $1000_2$). Note that each time counter U32 is preset to $8_{10}$, counter U32 can only decrement because the Q3 output of U32 is a logical "1" when preset to $8_{10}$ (binary $1000_2$). The logical "1" at the Q3 output of U32 forces, a logical "0" at the up/down input of U32 through U35C, U34C, and U35B.

When clean moisture is present on sensor 60 in enough quantity to cause wiper activation, flip-flop U31A low output will be a logical "1", which enables counter U32 to increment (possible only when the count is less than $8_{10}$).

It can be seen that when impure moisture is present on sensor 60, and the wipers are activated, counter U32 will decrement to zero in eight wiper cycles then produce a washer cycle. When clean moisture is present on the sensor and the wipers are activated, counter U32 will increment until a count of $8_{10}$ is reached. Counter U32 will then alternate between a count of $7_{10}$ and $8_{10}$.

Figure 9:
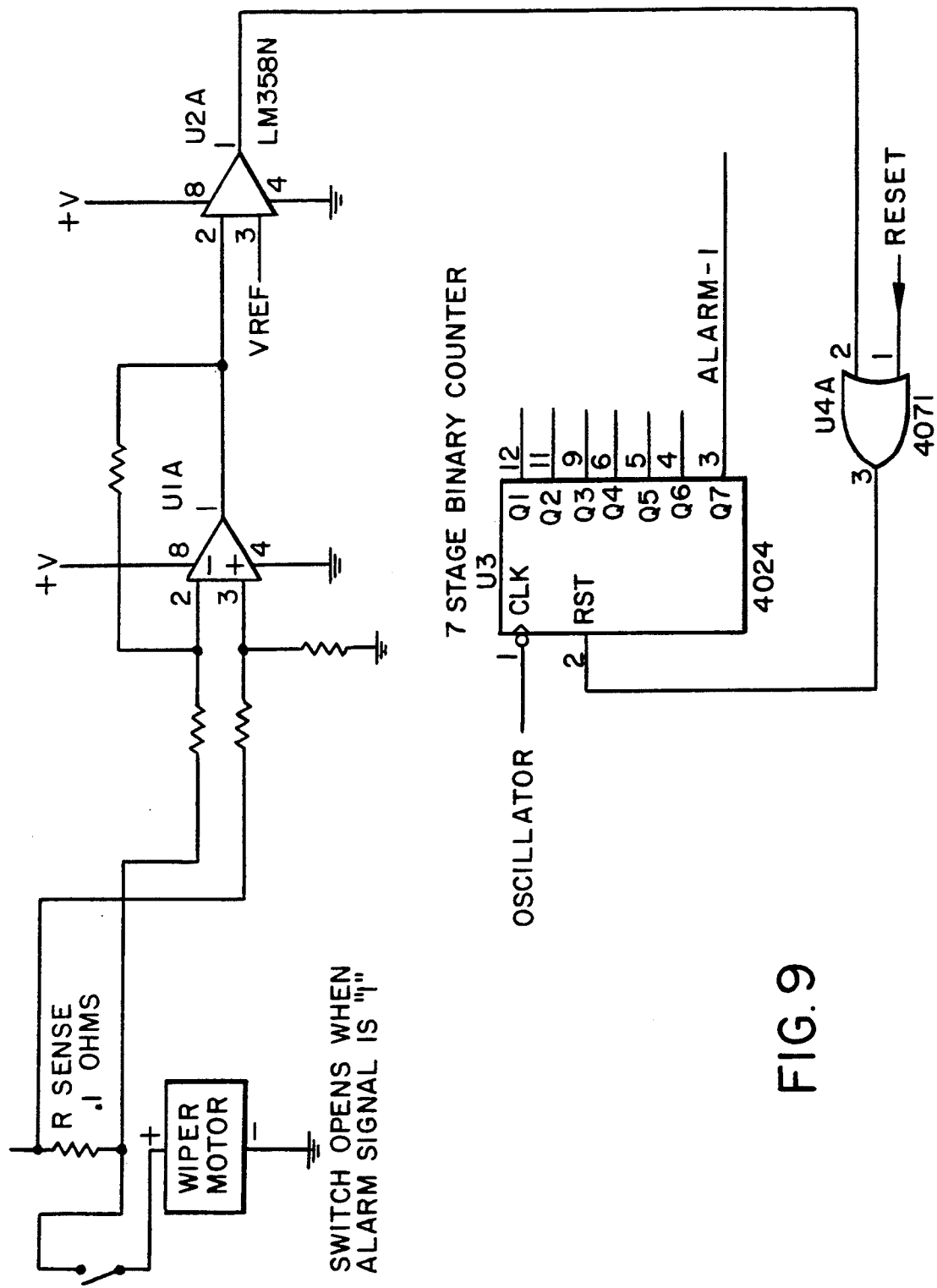
FIG. 9 is a schematic diagram of a windshield wiper "ICE ALARM" circuit which may be used with the present invention.

Ice alarm circuitry 116 in FIG. 6 may alternatively be realized using the design shown in FIG. 9. Wiper current is maximum when the motor is stalled. When stalled, the current through R-sense causes an $I \times R$ voltage drop across R-sense, which voltage is amplified by a differential amplifier U1. The output of amplifier U1 is compared to a voltage representing the maximum allowable motor current. When actual motor current exceeds this threshold, comparator output U2 switches to a logical "0" which, through OR gate U4, removes the reset on binary counter U3. If the motor current remains excessive long enough, the Q6 output of U3 will switch to a logical "1" representing the ICE ALARM, condition. Binary counter U3 is used as a filter for the transient current surges normally present when the wiper motor is initially activated. These surges are ignored because they are not present long enough to allow counter U3 to count to a binary $1000000_2$ (decimal $64_{10}$) and bring Q6 output to a logical "1". A reset signal is periodically generated to reset binary counter U3 to avoid occasional generation of an erroneous ICE ALARM.

FIG. 16 discloses a means for keeping alive the wiper drive motor signal until the wipers can be parked by the built-in park switch 306 in the wiper motor even when the ignition switch 308 is open. This is accomplished by requiring the wipers to cycle once following ignition circuit interruption by means of a direct battery connection through controller 310.

According to another feature of the present invention, the multi-strip moisture sensor is formed as a clear conductive coating on a transparent substrate, such as a glass windshield of an automobile. This clear conductive coating comprises a thin film of a composition selected from the group consisting of tin oxide ($SnO_2$:F) and indium tin oxide. The film can be produced by a number of well-known methods, including spraying, sputtering and chemical vapor deposition. After application, this film is bonded to the substrate (e.g. glass windshield) and may be up to 4,000 Å thick.

The preferable clear conductive coating is a tin oxide film deposited by chemical vapor deposition. This film is transparent, highly conductive and exhibits high abrasion resistance over other formulations using the same or different method of application.

A primary advantage of the chemical vapor deposition method using a tin oxide film is that it lends itself easily to the manufacturing process of windshields. Because chemical vapor deposition is carried out at approximately 430° C. to promote the reaction, it is very easily applied to newly manufactured windshields.

The optical properties of a tin oxide film are excellent, providing clear vision through the windshield, and the resistivity is extremely low.

Indium tin oxide can be used to form another suitable thin film for application on a windshield. The preferred method of application of indium tin oxide is by sputtering.

Whereas chemical vapor deposition can be carried out through a mask to form the sensor strip pattern, sputtering must be employed to form a thin film on a localized area. In this case the film on this area must be subsequently selectively etched into the sensor pattern.

The methods of application of tin oxide thin films are known from the article "Properties of $SnO_2$:F Films Prepared on Glass Substrates by the Spraying Method" by G. Mavrodiev, M. Gajdardziska and N. Novkovski, Electronics and Optics "Thin Solid Films", 113 (1984) pp. 93–100. However, the use of such films to form conductors, and specifically a moisture sensor, on a motor vehicle windshield was not known heretofore.

There has thus been shown and described a novel moisture-responsive control system which fulfills all the objects and advantages sought therefor. Many changes, modifications, variations and other uses and applications of the subject invention will, however, become apparent to those skilled in the art after considering this specification and the accompanying drawings which discloses the preferred embodiment thereof. All such changes, modifications, variations and other uses and applications which do not depart from the spirit and scope of the invention are deemed to be covered by the invention which is limited only by the claims which follow.

What is claimed is:

1. A automatic control system for operating an electrically actuated device in response to the presence of water moisture, said control system comprising, in combination:

a moisture sensor having a plurality of spaced-apart, exposed conductive sensor elements, said elements being arranged as in a plurality of adjacent pairs;

a voltage source;

current detection means, having an input and an output, for indicating, by a signal at said output, when the current flow at said input exceeds a prescribed threshold;

first connection means for connecting said voltage source to a first element of each of said plurality of adjacent pairs;

second connection means for connecting said input of said current detector means to a second element of each of said plurality of adjacent pairs;

means for incrementing said first and second connection means in synchronism, such that said voltage source is connected to said first element when said current detection means is connected to said second element of the same pair; and means for adapting said output signal of said current detection means to control the operation of said electrically actuated device.

2. The control system defined in claim 1, wherein said means for incrementing acts to alternately increment said first and second connection means.

3. The control system defined in claim 2, wherein said means for incrementing includes clock generator means for producing a square-wave signal and is adapted to increment said first connection means in response to the leading edge of a square-wave signal and to increment said second connection means in response to the trailing edge of a square-wave signal.

4. The control system defined in claim 2 wherein said adjacent pairs of elements are arranged successively on a substrate, and said connection means are incremented to connect said voltage source and said current detection means to successive pairs of said elements.

5. The control system defined in claim 1 further comprising a resistor connected between at least one element of each adjacent pair and ground.

6. The automatic control system defined in claim 1 wherein said means for adapting comprises integration means for accumulating said output signal of said current detection means to provide a control signal for said electronic actuated device.

7. The automatic control system defined in claim 1 wherein said first and second connection means each include a multiplexer connected to said plurality of sensor elements.

8. The automatic control system defined in claim 1 wherein said current detection means comprises a plurality of inputs connected to said plurality of sensor elements and summing means for determining the total number of adjacent sensor element pairs for which the current flow exceeds said prescribed threshold.

9. Apparatus for wiping a window in response to the presence of water moisture thereon, said apparatus comprising, in combination:

electrically actuated window wiper means having a wiper blade arranged to move in strokes to and fro across said window between two end positions to wipe moisture from a prescribed area on said window between said two end positions, said wiper means including open ignition park switch means for maintaining the operation of said wiper means, once actuated, until said wiper blade reaches a park position;

a moisture sensor, having a first electrical output, for sensing the presence of moisture on said window;

wiper position sensor means, having a second bounce-free electrical output, for determining the position of said wiper blade between said two end positions; and control means, having first and second inputs connected to said first and second electrical outputs, respectively, and a third electrical output connected to said wiper means, for actuating said wiper means when said moisture sensor indicates the presence of excessive moisture, said control means including means responsive to said position sensor means for maintaining the operation of said wiper means until said wiper blade is next positioned in said park position, thereby to cause said wiper blade to complete each stroke initiated.

10. The apparatus defined in claim 9 wherein said wiper position sensor means comprises at least one Hall-effect device and at least one magnet.

11. The apparatus defined in claim 10 wherein said wiper means comprises mechanical linkage means for mechanically actuating said wiper blade and wherein said magnet is arranged on said mechanical linkage.

12. The apparatus defined in claim 9 wherein said position sensor means produces a signal indicative of the position of said wiper blade along substantially its entire stroke.

13. The apparatus defined in claim 12, wherein said position sensor means comprises at least one analog Hall-effect device for producing an analog signal representing the position of said wiper blade along its stroke.

14. The apparatus defined n claim 9, wherein said position sensor means produces a signal indicative of presence of said wiper blade at one particular position along its stroke.

15. The apparatus defined in claim 9 wherein said park switch means includes keep-alive means for maintaining said operation during ignition shutdown until said wiper blade reaches said park position.

16. Apparatus for wiping a window in response to the presence of water moisture thereon, said apparatus comprising, in combination:

electrically actuated window wiper means having a wiper blade arranged to move in strokes to and fro across said window to wipe moisture from a prescribed area, said wiper means including park switch means for maintaining the operation of said wiper means, once actuated, until said wiper blade reaches a park position;

a moisture sensor arranged on said window within said prescribed area in the path of said wiper blade for sensing the presence of moisture on said window, said moisture sensor having a first electrical output;

wiper position sensor means, having a second electrical output, for determining when said wiper blade is positioned over said moisture sensor; and control means, having first and second inputs connected to said first and second electrical outputs, respectively, and a third electrical output connected to said wiper means, for producing a wiper actuating signal at said third output when said moisture sensor indicates the presence of excessive moisture, said control means including means responsive to said position sensor means for inhibiting said wiper actuating signal when said wiper blade is positioned over said moisture sensor, thereby to prevent reactuation of said wiper means due to the presence of moisture carried by the wiper blade over said moisture sensor.

17. The apparatus defined in claim 16 wherein said position sensor means comprises at least two Hall-effect devices and magnets, one of said Hall-effect devices and said magnets being arranged to move in synchronism with said wiper blade and another of said Hall-effect devices and said magnets being stationary with respect to said wiper blade.

18. The apparatus defined in claim 17 wherein said wiper means includes mechanical linkage means for mechanically actuating said wiper blade and wherein one of said magnets is arranged on said mechanical linkage.

19. Window wiper apparatus comprising, in combination:

electrically actuated window wiper means having a wiper blade arranged to move in strokes to and fro across said window to wipe moisture from a prescribed area on said window, said wiper means including open ignition park switch means for maintaining the operation of said wiper means, once actuated, until said blade reaches a park position;

wiper position sensor means, having a first bounce-free electrical output, for determining when said wiper blade has moved away from said park position; and control means, having an input connected to said first electrical output and a second electrical output connected to said window wiper means, for producing a signal at said second output to control the operation of said wiper means, said control means including means responsive to said position sensor means for interrupting the operation of said wiper means if said wiper blade remains in said park position for a prescribed time after initiating operation of said wiper means, thereby to prevent damage to said wiper means when said wiper blade is frozen in position for any reason.

20. The apparatus defined in claim 19 wherein said control means further comprises means for producing an audible alarm when said wiper means operation is interrupted.

21. A automatic control system for operating an electrically actuated window wiper device in response to the presence of water moisture on a window, said window wiper device including a wiper blade and means for moving said wiper blade in strokes to and fro across the window to wipe the window clean in a prescribed area, and for operating a window washer device in response to the presence of impure moisture on the window, said control system comprising, in combination:

a moisture sensor arranged on the window within the prescribed area and having a plurality of spaced-apart, exposed conductive sensor elements forming at least one adjacent pair of elements;

a voltage source;

current detection means, having at least one input and at least one output, for indicating, by a signal at said output, when the current flow at said input exceeds a first prescribed threshold and when it exceeds a second prescribed threshold which is higher than said first prescribed threshold;

first means for connecting said voltage source to at least a first one of said sensor elements;

second means for connecting said input of said current detection means to at least a second one of said sensor elements, said first and second ones of said sensor elements to which said voltage source and said current detection means are simultaneously connected belonging both to the same pair of adjacent elements; and control means, coupled to current detection means, for enabling said window wiper device to be switched on when the current received from at least one pair of adjacent sensor elements exceeds said first prescribed threshold, and for enabling said window washer device to be switched on when the current received from at least one pair of adjacent sensor elements exceeds said second prescribed threshold.

22. The apparatus defined in claim 21 wherein said moisture sensor includes a plurality of adjacent pairs of sensor elements and wherein said control means includes means for enabling said window wiper device to be switched on when the number of said pairs of sensor elements, for which the current flow through each respective pair exceeds said first prescribed threshold, exceeds a third prescribed threshold.

23. The apparatus defined in claim 22, wherein said control means includes:

latch means having a set input, coupled to said output of said current detection means, a reset input and a first output indicative of the state of said latch means, said latch means being set when said current flow at said input of said current detection means exceeds said second prescribed threshold;

counter means having a counter input, an enable input coupled to said first output of said latch means and an output indicative of the count in said counter means; and means for producing at least one pulse during each complete stroke of said wiper blade, said pulse being applied to said reset input of said latch means and said counter input of said counter means, wherein said window washer device is switched on when the count in said counter means is at least equal to a fourth prescribed threshold.

24. The apparatus defined in claim 23 further comprising means for resetting said counter means and separate means for activating said window wiper device when said window washer device is activated.

25. The apparatus defined in claim 22 wherein said control means includes:

latch means coupled to said current detection means for indicating, when in one state, the presence of impurities on said window and indicating, when in another state, the absence of impurities on said window, said latch means having a first output indicative of the state of said latch means;

up-down counter means having a count input, a counter control input coupled to said first output of said latch means and an output indicative of the count in said counter means; and means for producing at least one pulse during each complete stroke of said wiper blade, said pulse being applied to said count input of said counter means, wherein said counter means counts in one direction when impurities are present and in the opposite direction when impurities are not present on said window, and wherein said window washer device is switched on when the count in said counter means is at least equal to a fourth prescribed threshold.

26. The apparatus defined in claim 21 wherein said control means includes means for activating said window washer device on when the current flowing through at least one pair of said sensor elements continues to exceed said second prescribed threshold after said wiper blade passes over said moisture sensor.

27. The apparatus defined in claim 26, wherein said control means includes means for activating said window washer device when the current flowing through at least one pair of said sensor elements continues to exceed said second prescribed threshold after said wiper blade passes over said moisture sensor a number of times which exceeds a fourth prescribed threshold.

28. The apparatus defined in claim 21 further comprising sensitivity display means for displaying said second prescribed threshold.

29. The apparatus defined in claim 21 further comprising moisture display means for displaying the number of said adjacent moisture sensor pairs for which said current received exceeds said first prescribed threshold.

30. A method for cleaning a window by automatic means comprising the steps of:
 (a) detecting the presence of moisture on said window;
 (b) detecting the presence of contamination on said window;
 (c) detecting the presence of ice on said window;
 (d) heating said window as necessary to melt said ice;
 (e) rinsing said window with a cleaning solution as necessary to remove said contamination; and
 (f) wiping said window to remove said moisture.

* * * * *